(12) United States Patent
Horowitz et al.

(10) Patent No.: US 11,370,467 B1
(45) Date of Patent: Jun. 28, 2022

(54) FOLDING WAGON HAVING A HEIGHT ADJUSTABLE FRAME AND COLLAPSIBLE HANDLES

(71) Applicants: Brian Horowitz, Lake Forest, CA (US); Thomas Wai-Yan Wang, San Gabriel, CA (US); William F Ryczek, Pomona, CA (US)

(72) Inventors: Brian Horowitz, Lake Forest, CA (US); Thomas Wai-Yan Wang, San Gabriel, CA (US); William F Ryczek, Pomona, CA (US)

(73) Assignee: Brian Horowitz, Lake Forest, CA (US)

( * ) Notice: Subject to any disclaimer, the term of this patent is extended or adjusted under 35 U.S.C. 154(b) by 0 days.

(21) Appl. No.: 17/169,213

(22) Filed: Feb. 5, 2021

(51) Int. Cl.
*B62B 3/02* (2006.01)
*B62B 5/06* (2006.01)

(52) U.S. Cl.
CPC .............. *B62B 3/02* (2013.01); *B62B 5/066* (2013.01); *B62B 5/067* (2013.01)

(58) Field of Classification Search
CPC .......... B62B 3/02; B62B 3/027; B62B 5/064; B62B 5/066; B62B 5/067; B62B 7/06; B62B 7/086; B62B 2205/145; B62B 2206/06
See application file for complete search history.

(56) References Cited

U.S. PATENT DOCUMENTS 2,604,334 A * 7/1952 Schultz ..................... B62B 3/02
280/47.35
6,070,899 A * 6/2000 Gines ...................... B62B 3/027
280/651
9,126,610 B1 * 9/2015 Abi ........................ B62B 5/0003
(Continued)

FOREIGN PATENT DOCUMENTS

DE       102015103844 A1 * 10/2015  ............... B62B 3/02
GB           585540 A   *  2/1947  ............... B62B 3/02
WO      WO-2019007196 A1 *  1/2019  ............. B62B 7/086

OTHER PUBLICATIONS

Wonderfold X2 Stroller Wagon, internet advertisement dated Sep. 25, 2020, retrieved from Internet Wayback Machine Mar. 26, 2021, https://www.wonderfoldwagon.com/products/x2-stroller-wagon (Year: 2020).*

*Primary Examiner* — Steve Clemmons
(74) *Attorney, Agent, or Firm* — Morland C. Fischer

(57) ABSTRACT

Disclosed is a wagon adapted to be folded between an expanded open configuration and a compact collapsed configuration. A basket of the wagon is carried by a collapsible frame having height adjustment legs at the corners thereof. Height adjustment guides that stand upwardly from wheel brackets are slidable up and down through respective height adjustment legs such that the elevation of the frame and the basket carried thereby can be selectively changed. Rotatable handles are pivotally attached to the wagon at the front and the rear of the wagon frame. Telescoping canopy support assemblies are removably received downwardly within and upwardly from respective ones of the height adjustment guides to hold a removable canopy over the wagon basket. A collapsible wagon frame support has a set of rotatable frame reinforcing rods pivotally and detachably connected by ball and socket couplings to the bottom of the wagon frame at the corners thereof.

18 Claims, 14 Drawing Sheets

(56) References Cited

U.S. PATENT DOCUMENTS

| | | | |
|---|---|---|---|
| 9,145,154 B1* | 9/2015 | Horowitz | B62B 7/008 |
| 9,211,897 B2* | 12/2015 | Yang | B62B 3/001 |
| 9,956,981 B1* | 5/2018 | Fitzwater | B62B 3/007 |
| 9,975,565 B1* | 5/2018 | Liao | B62B 3/02 |
| 10,040,470 B1* | 8/2018 | Horowitz | B62B 3/007 |
| 10,099,711 B1* | 10/2018 | Sun | B62B 3/025 |
| 10,131,373 B1* | 11/2018 | Ness | B60R 5/04 |
| 10,501,103 B1* | 12/2019 | Wang | B62B 3/025 |
| 10,850,758 B1* | 12/2020 | Griffith | B62B 5/06 |
| 10,953,903 B1* | 3/2021 | Park | B62B 3/02 |
| 2005/0186023 A1* | 8/2005 | Lee | F16B 7/105 403/109.3 |
| 2008/0303248 A1* | 12/2008 | Chaparro | B62B 3/027 280/651 |
| 2009/0206226 A1* | 8/2009 | Forrest | A47C 7/002 248/354.6 |
| 2010/0090444 A1* | 4/2010 | Chen | B62B 3/007 280/651 |
| 2010/0218670 A1* | 9/2010 | Keng | F16M 11/16 89/37.04 |
| 2011/0204598 A1* | 8/2011 | Stevenson | B62B 3/007 280/639 |
| 2012/0187660 A1* | 7/2012 | Liao | B62B 7/062 280/642 |
| 2013/0319488 A1* | 12/2013 | Chiu | A61H 3/00 135/67 |
| 2014/0083005 A1* | 3/2014 | Collins | F16M 11/32 47/66.6 |
| 2015/0329135 A1* | 11/2015 | Sun | B62B 9/24 280/649 |
| 2017/0058930 A1* | 3/2017 | Liu | A61H 3/04 |
| 2018/0050712 A1* | 2/2018 | Mitchell | B60R 9/06 |
| 2018/0170418 A1* | 6/2018 | Choi | B62B 7/08 |
| 2018/0327011 A1* | 11/2018 | Horowitz | B62B 5/065 |
| 2020/0139999 A1* | 5/2020 | Ma | B62B 7/083 |
| 2020/0216104 A1* | 7/2020 | Leblanc | B62B 3/022 |
| 2021/0086812 A1* | 3/2021 | Park | B62B 3/02 |

\* cited by examiner

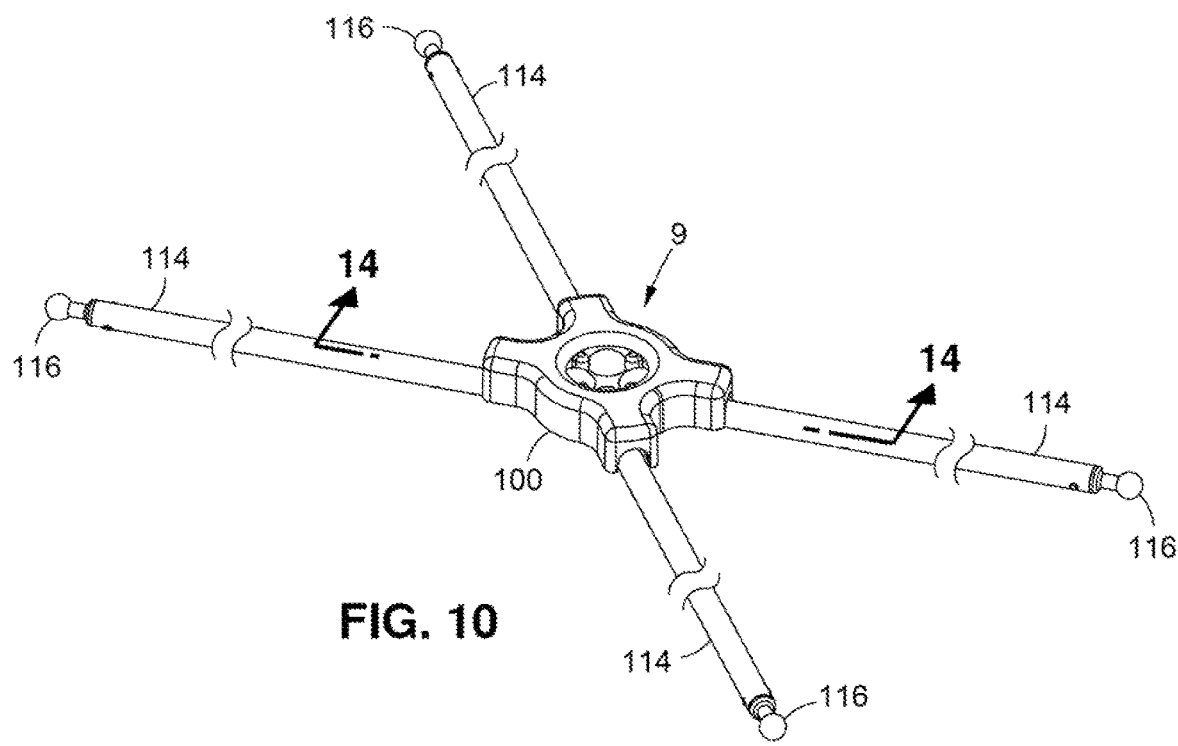
FIG. 10
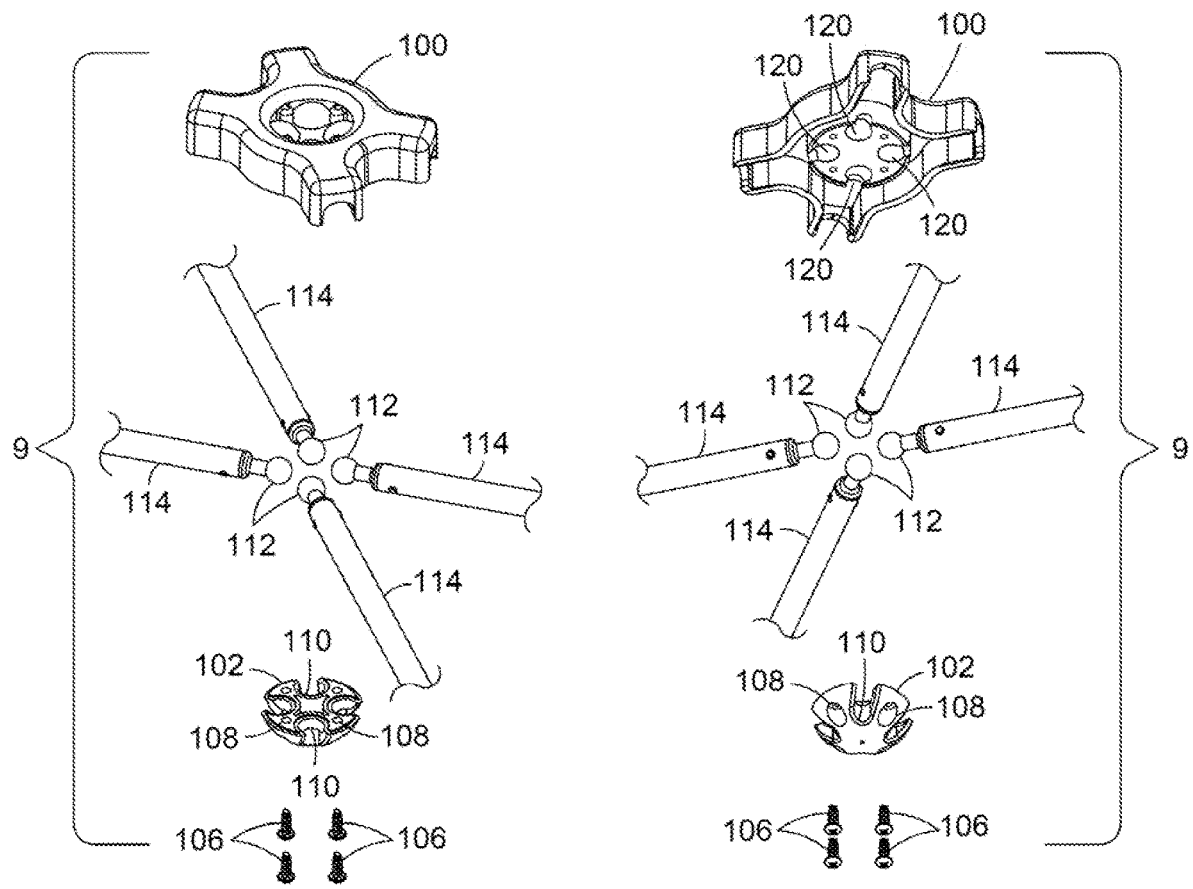
FIG. 11
FIG. 12

FOLDING WAGON HAVING A HEIGHT ADJUSTABLE FRAME AND COLLAPSIBLE HANDLES

BACKGROUND OF THE INVENTION

1. Field of the Invention

This invention relates to a wagon of the type that can be folded between an expanded open configuration during use and a compact collapsed configuration at which the wagon can be transported or stored when it is not in use. A basket of the wagon is carried by a collapsible frame that is adapted to be raised or lowered relative to a set of wheels on which the wagon rolls from place-to-place. Rotatable and collapsible handles are attached to the wagon at the front and rear of the wagon frame to which pulling and pushing forces are applied to cause the wagon to roll on its wheels in the manner of a stroller.

2. Background Art

Wagons are known that can be folded between expanded open and compact collapsed configurations. By way of example, reference can be made to any of U.S. Pat. No. 9,145,154 issued Sep. 29, 2015, or 9,771,093 issued Sep. 16, 2017, or 10,040,470 issued Aug. 7, 2018 at which such folding wagons are shown and described. Each folding wagon includes a basket that is carried and held up by a collapsible frame. Each folding wagon also includes a set of wheels and a handle attached to the wagon at the front and/or the rear of the frame thereof.

In each case, the collapsible frame of the wagons referred to above has a fixed elevation relative to the wheels on which the wagon rolls from place to place. In particular, the wagon frame and the wagon basket carried by the frame cannot be raised or lowered at those times when articles are loaded into or removed from the basket. That is, should the user be loading the wagon with a heavy object or a small child, it would be advantageous to be able to lower the wagon basket to lay closer to the wheels to reduce the distance over which the object must be lifted to reach the basket. On the other hand, should the user be removing articles from the basket, it would be advantageous to be able to raise the basket to avoid the user having to frequently bend down. Accordingly, it would be desirable to improve the conventional folding wagon by including a collapsible frame for holding up a basket where the elevation of the frame and the basket carried thereby relative to the wheels of the wagon can be selectively adjusted to facilitate the user's access to the basket.

SUMMARY OF THE INVENTION

In general terms, a wagon is disclosed that is adapted to be folded between an expanded open configuration during use and a compact collapsed configuration at which to facilitate the wagon's transport or storage when it is not in use. The wagon includes a set of wheels, a basket in which to transport articles and/or small children, and a collapsible frame which carries and holds up the basket. Detachably connected to the bottom of the wagon frame below the basket is a collapsible wagon frame support. Relatively narrow height adjustment guides are connected to and stand upwardly from respective wheel brackets to which the set of wheels are coupled. Relatively wide height adjustment legs are located at the corners of the wagon frame. The narrow height adjustment guides are slidable upwardly and downwardly through the wide height adjustment legs in response to pushing or pulling forces applied to the set of wagon wheels by which the elevation of the frame and the basket carried thereby may be selectively changed relative to the wagon wheels.

Surrounding the bottom of each height adjustment leg at each corner of the wagon frame is a lower leg coupler having a collar that includes a rotatable and spring-biased locking arm. The locking arm of the collar has a locking pin projecting inwardly therefrom for receipt through one of a series of height fixing holes that are formed through each upstanding height adjustment guide that is surrounded by a height adjustment leg. With the locking pin of the rotatable locking arm of the collar received through a height fixing hole, the height adjustment guide is unable to slide through the height adjustment leg, and the wagon frame is thereby locked in place at the first elevation relative to the wagon wheels. When it is desirable to change the elevation of the wagon frame and the basket carried thereby, the spring-biased locking arm of the collar is rotated in a first direction away from the height adjustment leg to cause the locking pin to be withdrawn from the height fixing hole that is formed in the height adjustment guide. The upstanding narrow height adjustment guide is now free to slide upwardly and downwardly through the wide height adjustment leg in response to a pushing or a pulling force applied to one of the set of wheels. After all of the height adjustment guides are moved up or down through respective height adjustment les at the corners of the frame, the elevation of the wagon frame and the wagon basket is correspondingly changed to suit the needs of the user. Each spring-biased locking arm is then permitted to automatically rotate in an opposite direction towards its height adjustment leg, whereby the locking pin of the locking arm is moved through a different one of the series of height fixing holes formed in the height adjustment guide, and the wagon frame is thereby locked in place at a different elevation.

Located at each corner of the wagon frame is a telescoping canopy rod assembly by which to hold a removable canopy above the wagon basket. Each canopy rod assembly is slidable up and down through one of the upstanding height adjustment guides that are surrounded by respective height adjustment legs of the wagon frame. The telescoping canopy rod assemblies are pulled upwardly to an axially extended position past the upper leg couplers located at the tops of the height adjustment legs to hold the canopy up. In the alternative, the canopy rod assemblies can be pushed downwardly to a retracted position within the height adjustment guides when the canopy is removed from the wagon.

A telescoping handle is pivotally attached to the wagon at the front of the wagon frame so as to be capable of rotating downwardly from a vertical position through an angle of about 180 degrees towards the wagon wheels. The telescoping handle includes lower, upper and intermediate handle members that can be either pulled outwardly from one another to an axially extended position or pushed inwardly of one another to a collapsed position depending upon whether the handle is being used to apply a pulling force to the wagon. A flexible handle return having a spring memory extends outwardly from the lower handle member to engage the front of the wagon frame and flex thereagainst when the telescoping handle is rotated downwardly in a first direction. When the rotation of the handle is completed, the handle return expands to cause the handle to automatically rotate upwardly and in an opposite direction back to its initial vertical position.

A rotatable and collapsible handle assembly is pivotally connected to the wagon at the rear of the wagon frame by means of push-button actuated couplers so that the handle assembly is rotatable at the couplers from a first position extending rearwardly from the wagon frame at which to receive a pushing force in the manner of a stroller to a second position extending downwardly from and alongside the frame when the wagon is to be folded to its compact collapsed configuration. A pair of horizontally extending push bars at the top of the handle assembly are connected end-to-end one another by a push-button. When the wagon will be folded, the push-button is depressed by which to enable the handle assembly to collapse downwardly and inwardly such that the pair of push bars rotate at the push-button from their end-to-end alignment to a generally V-shaped alignment.

The collapsible wagon frame support that is detachably connected to the bottom of the wagon frame below the wagon basket includes a combination upper ball socket cover and a lower hub that are connected one above the other at the center of the wagon frame support. The combination upper cover and lower hub establish ball sockets within which to pivotally receive balls carried at first ends of a plurality of frame reinforcing rods that radiate outwardly from the ball sockets. Balls carried at the opposite ends of the frame reinforcing rods are pivotally and removably received by respective ball receptacles that are mounted on the lower leg couplers that surround the height adjustment legs at the corners of the wagon frame. The wagon frame support is detached from the wagon frame by pulling the balls that are carried at the opposite ends of the frame reinforcing rods outwardly from respective ones of the ball receptacles. In the case when the wagon is folded to its compact collapsed configuration with the wagon frame support still attached to the wagon frame, an upward lifting force is applied to the combination upper ball socket cover and lower hub at the center of the wagon frame support by which to correspondingly cause the frame reinforcing rods to rotate upwardly and the wagon frame to collapse inwardly upon itself.

BRIEF DESCRIPTION OF THE DRAWINGS

FIG. 10 is a perspective view of the collapsible frame support after being detached from the bottom of the wagon frame shown in FIG. 1;

FIGS. 11 and 12 are partial top and bottom exploded views of the collapsible wagon frame support shown in FIG. 10;

DESCRIPTION OF THE PREFERRED EMBODIMENT

Referring initially to FIGS. 1-6 of the drawings, there is shown a wagon 1 that is adapted to be folded between an expanded open configuration during use and a compact collapsed configuration at which to facilitate the wagon's transport or storage when it is not in use. A folding wagon that has certain features that are common to the wagon that is referred to immediately above can be found by referring to pending patent application Ser. No. 15/590,942 filed May 9, 2017. Therefore, the common features of the folding wagon disclosed in the aforementioned patent application and the folding wagon 1 herein disclosed are incorporated by reference, and only a brief description thereof will be provided.

The folding wagon 1 has a collapsible rectangular frame 3 that carries a basket 5 (best shown in FIGS. 1 and 2) within which to transport a variety of articles including, but not limited to, sporting and camping goods, picnic supplies, business inventory and small children. The basket 5 is preferably manufactured from fabric and is open at the top and closed along the bottom, front, rear and sides. The basket 5 is held up by the frame 3 above a collapsible wagon frame support 9 that is detachably connected to the bottom of the frame at the corners thereof. Details of the collapsible wagon frame support 9 and its ability to be detached from the wagon frame 3 will be provided hereinafter when referring to FIGS. 9-14.

Figure 4:
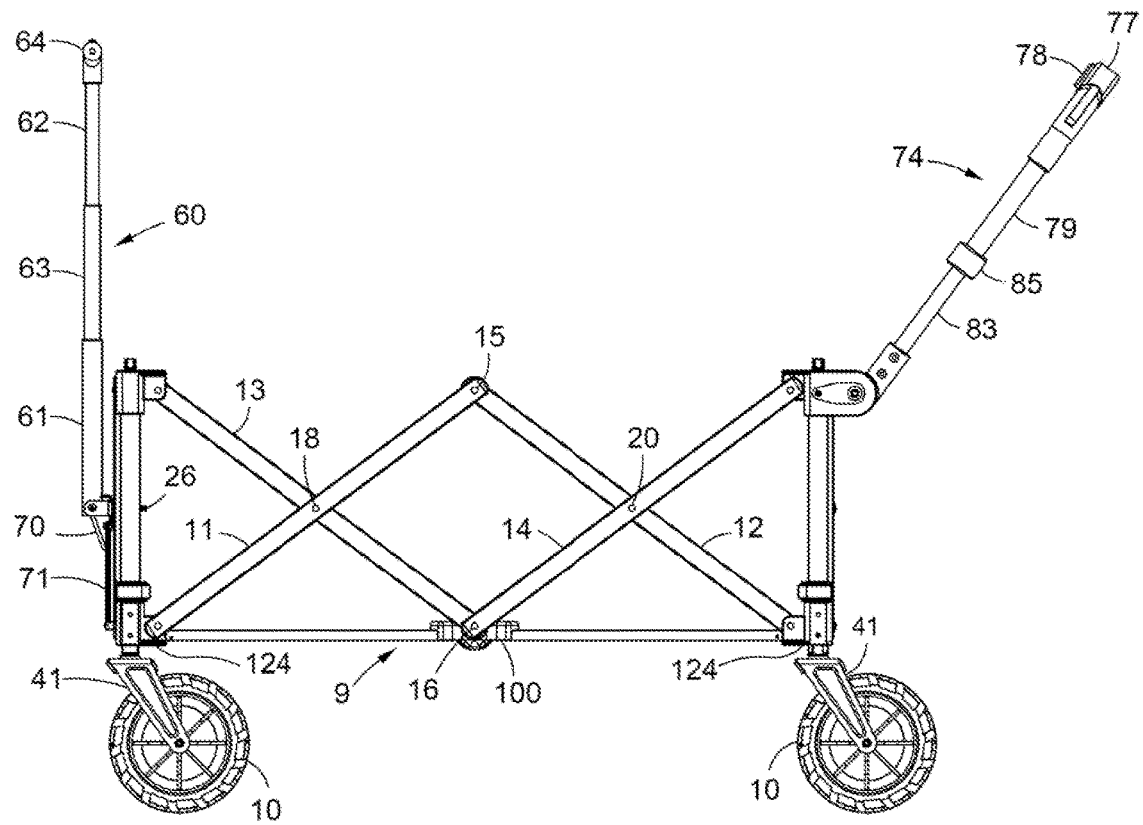
FIG. 4 is a side view of the wagon frame shown in FIG. 3.

A wheel 10 from a set of wheels is connected to the bottom and each corner of the wagon frame 3 to permit the wagon 1 to roll from place to place. The frame 3 has an identical pair of sides and identical front and rear ends. Each identical side of the wagon frame 3 lies adjacent a corresponding side of the wagon basket 3 and includes a first pair of diagonally extending side support arms 11 and 12 and a second pair of diagonally extending side support arms 13 and 14. As is best shown in FIG. 4, the first pair of side support arms 11 and 12 are connected to one another at first ends thereof by means of an upper pivot coupling 15, so that the support arms 11 and 12 point upwardly to make an angle of about 90 degrees. The second pair of side support arms 13 and 14 are connected to one another at first ends thereof by means of a lower pivot coupling 16, so that the support arms 13 and 14 point downwardly to also make an angle of about 90 degrees. The diagonally extending side support arms 11 and 13 are coupled to and intersect one another about midway between the first and opposite ends thereof by means of a first intermediate pivot coupling 18, and the diagonally extending side support arms 12 and 14 are coupled to and intersect one another about midway between the first and opposite ends thereof by means of a second intermediate pivot coupling 20.

Figure 5:
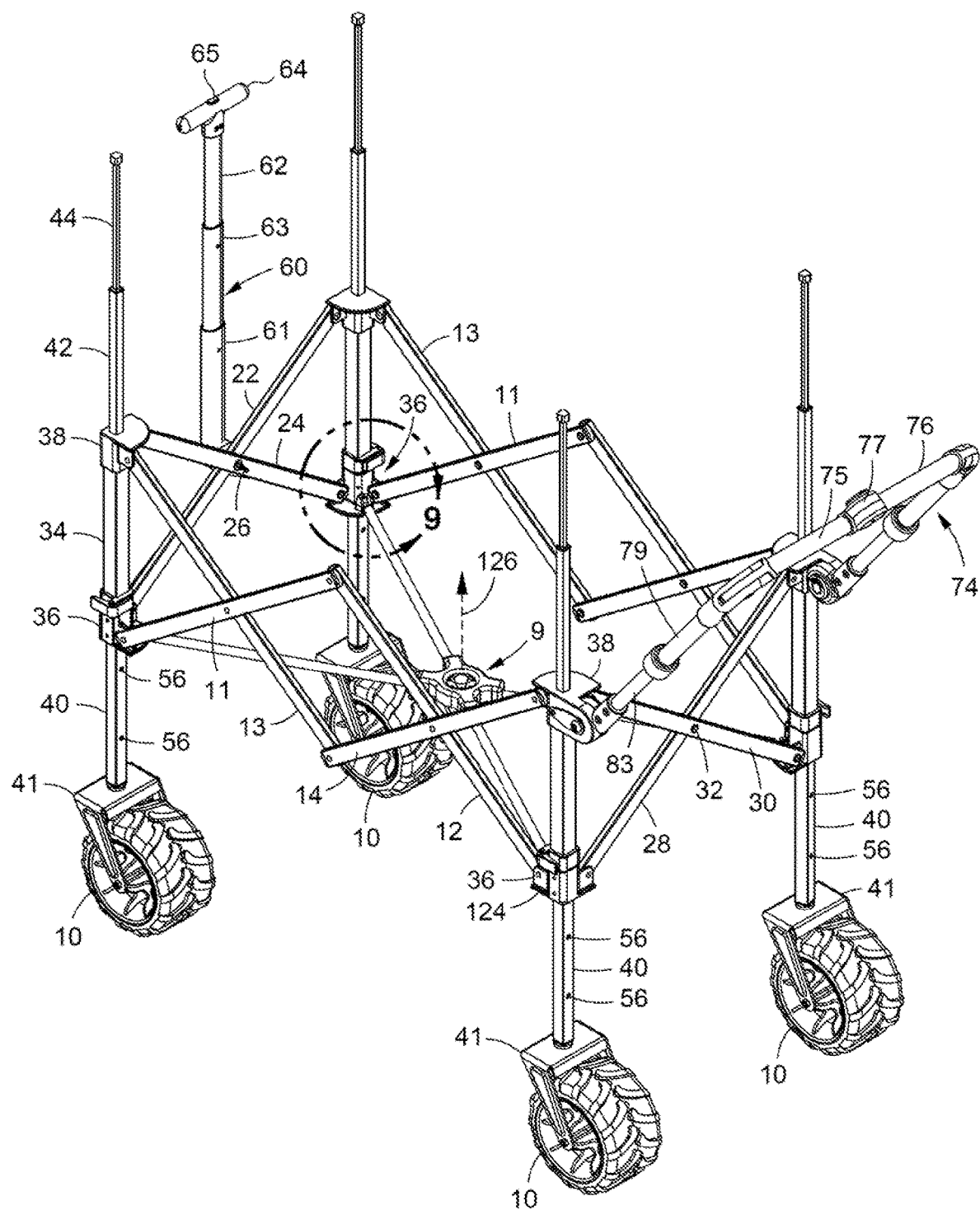
FIG. 5 is a rear and left side perspective view of the wagon frame shown in FIG. 1 with each of the telescoping canopy support rod assemblies and the telescoping handle assembly in the axially extended position.

The front of the wagon frame 3 has a pair of intersecting and diagonally extending front support arms 22 and 24. As is best shown in FIG. 5, the intersecting front support arms 22 and 24 are coupled to one another about midway between the first and opposite ends thereof by means of an intermediate pivot coupling (e.g., a bolt) 26. Likewise, the rear of the wagon frame 3 has a pair of diagonally extending rear support arms 28 and 30. As is also best shown in FIG. 5, the rear support arms 28 and 30 are coupled to and intersect one another about midway between the first and opposite ends thereof by means of an intermediate pivot coupling 32.

Figure 2:
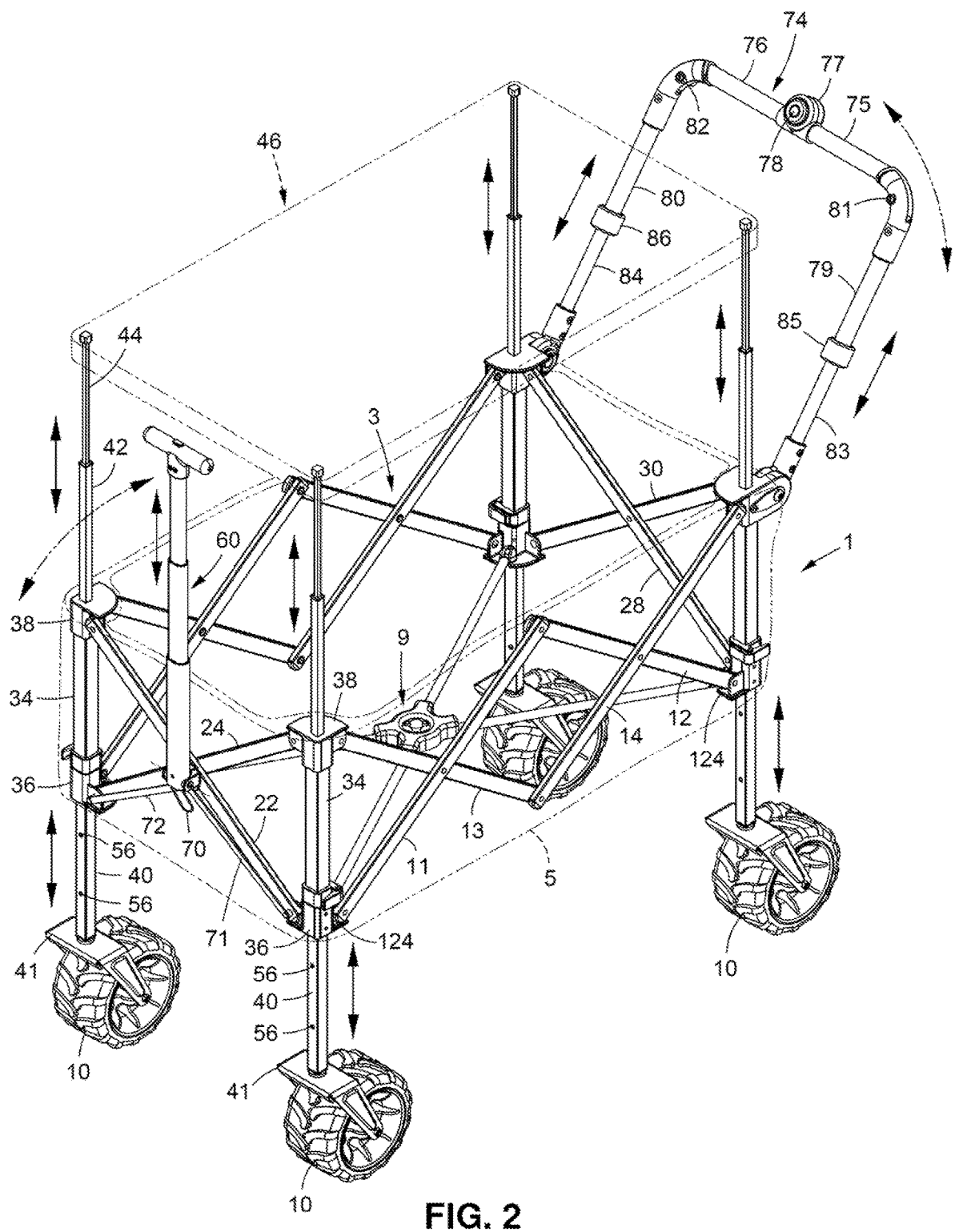
FIG. 2 is a front and left side perspective view of the wagon frame shown in FIG. 1 with telescoping canopy support rod assemblies located at the corners of the frame in an axially extended position and a telescoping handle assembly located at the front of the frame in an axially extended position.
Figure 3:
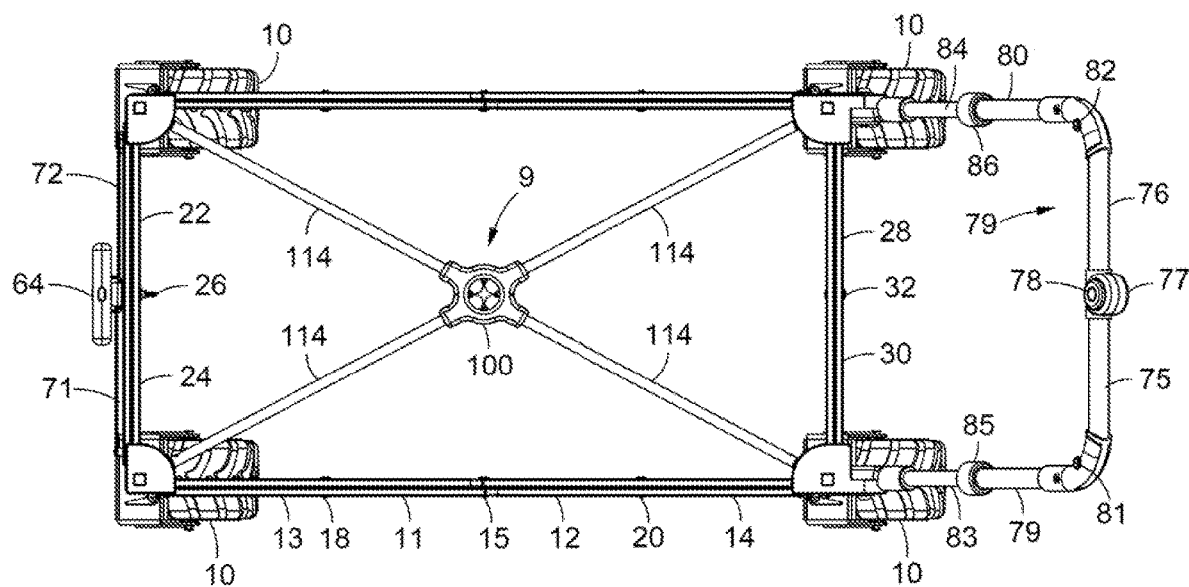
FIG. 3 is a top view of the wagon frame shown in FIG. 2 but with the telescoping canopy support rod assemblies thereof in a retracted position.
Figure 9:
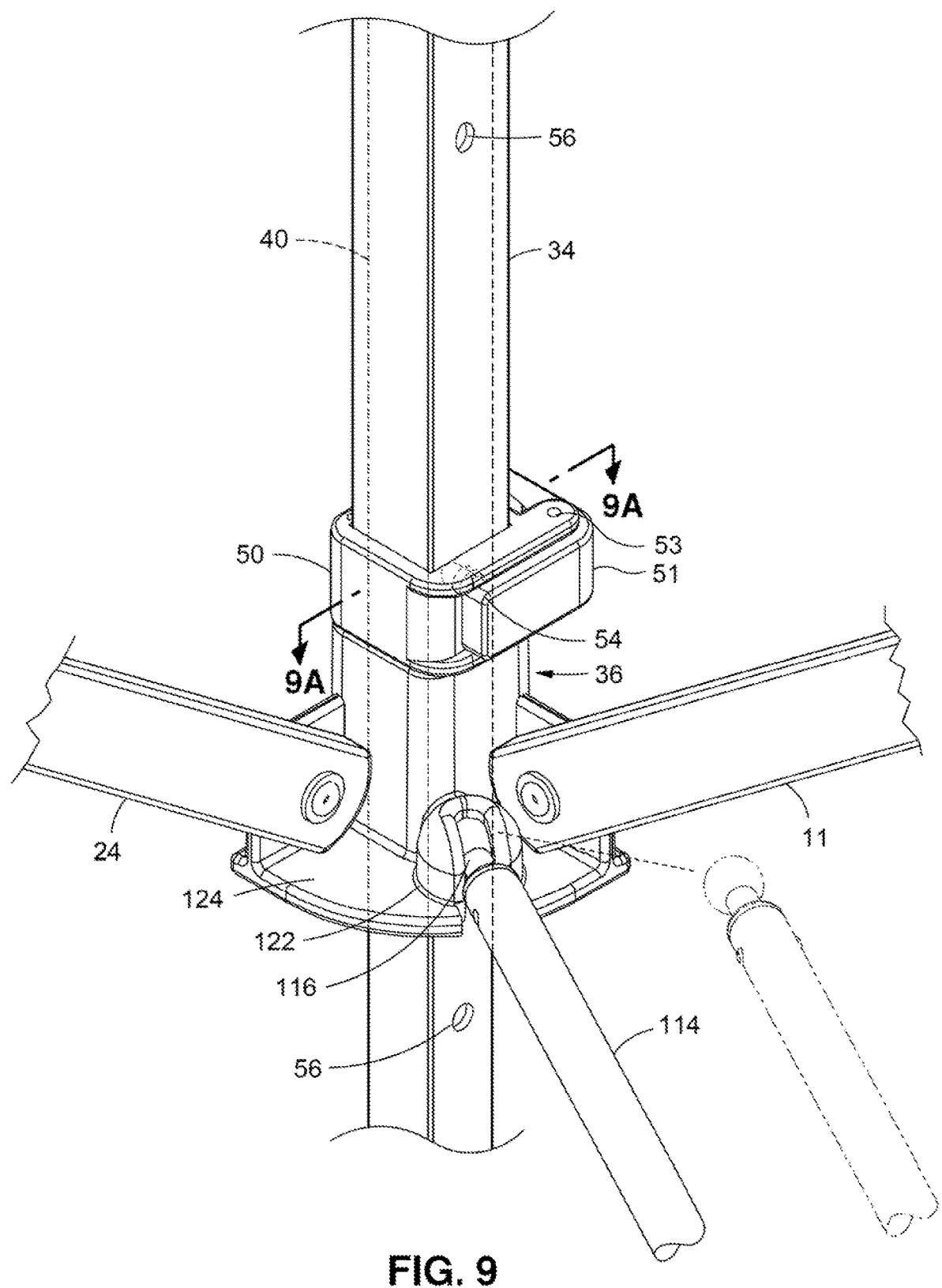
FIG. 9 is an enlarged detail taken from FIG. 5 showing a lower leg coupler surrounding the bottom of a height adjustment leg that is located at one corner of the wagon frame.

Located at each corner of the rectangular wagon frame 3 is a hollow and relatively wide height adjustment leg 34. As is best shown in FIGS. 2, 5 and 9, each height adjustment leg 34 is connected at the bottom thereof to a lower leg coupler 36 that is located at the bottom of the wagon frame 3 and at the top thereof to an upper leg coupler 38 that is located at the top of the wagon frame 3. A hollow and relatively narrow height adjustment guide 40 extends through the lower leg coupler 36 to be fixedly connected at the bottom thereof to a U-shaped wheel bracket 41. The relatively narrow height adjustment guide 40 is sized to be received inwardly of and surrounded by the relatively wide height adjustment leg 34 at each corner of the wagon frame 3. The wheel bracket 41 to which the upstanding height adjustment guide 40 is fixedly connected is pivotally coupled to one of the set of wheels 10 of the wagon 1. As will soon be described, each height adjustment guide 40 is adapted to slide upwardly and downwardly through a respective height adjustment leg 34 towards and away from the wagon basket 5 by which to selectively adjust the height of the frame 3 and the basket 5 carried thereby relative to the wheels 10 over which the wagon is rolled.

As will be described in greater detail when referring to FIGS. 7 and 8, a hollow telescoping canopy rod guide post 42 stands upwardly from the upper leg coupler 38 at the top of each height adjustment leg 34. A telescoping canopy support rod 44 stands upwardly from and is slidable up and down through the canopy rod guide post 42. In this same regard, the telescoping canopy rod guide post 42 is slidable up and down through the hollow height adjustment guide 40 that is surrounded by the hollow height adjustment leg 34 at one corner of the wagon frame 3. By virtue of the foregoing, the height adjustment guide 40, the canopy guide post 42, and the canopy support rod 44 can be located one within the other to create an adjustable telescoping canopy rod assembly by which to engage one corner of a removable canopy (designated 46 in FIG. 2) so that the canopy is held above the wagon basket 5.

Figure 7:
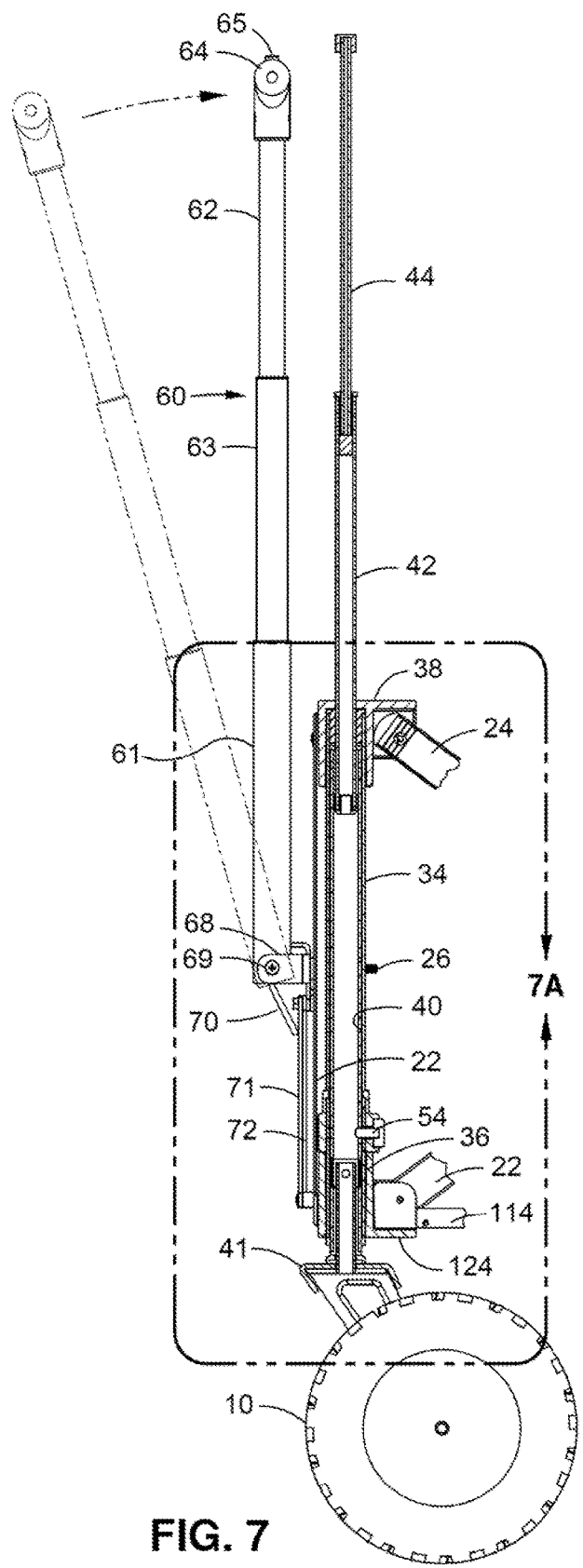
FIG. 7 is a cross-section of the front of the wagon frame taken along lines 7-7 of FIG. 6.
Figure 8:
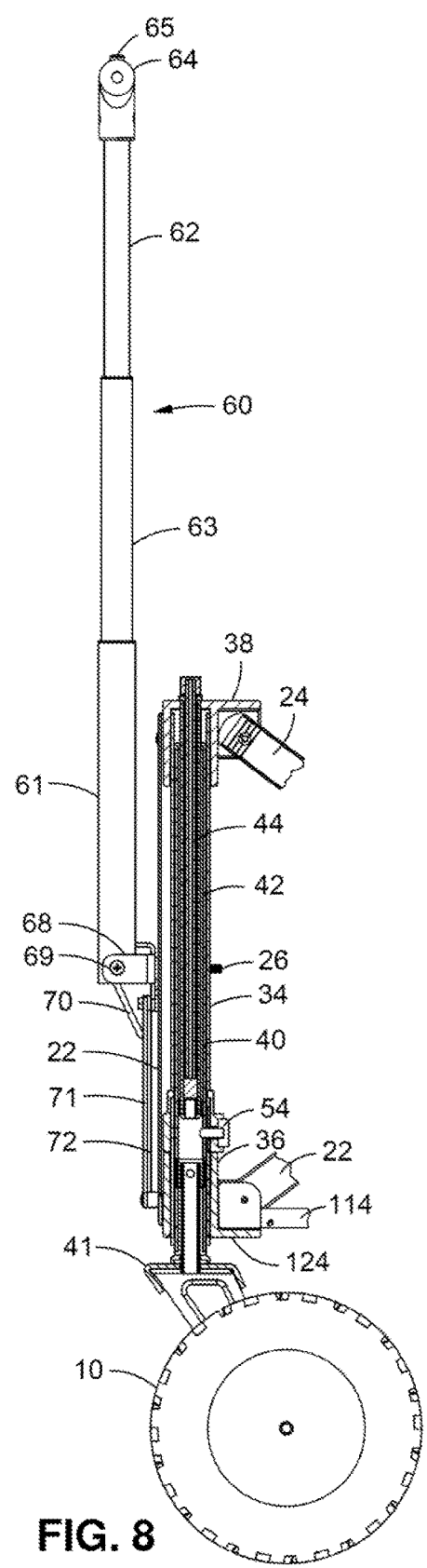
FIG. 8 shows the cross-section of FIG. 7 after one of the telescoping canopy support rod assemblies at one of the corners of the wagon frame has been moved to the retracted position.

Referring briefly now to FIGS. 7 and 8 of the drawings, the operation is described of one of the aforementioned telescoping canopy rod assemblies that is located at one of the corners of the wagon frame 3 to hold up one corner of the canopy 46 of FIG. 2. FIG. 7 shows the adjustable telescoping canopy rod assembly axially extended to a maximum height to engage one corner of the canopy. In this case, the canopy rod guide post 42 is pulled upwardly and outwardly from the height adjustment guide 40 to stand above the upper leg coupler 38 at the top of the height adjustment leg 34, and the canopy support rod 44 is pulled upwardly and outwardly from the canopy rod guide post 42. FIG. 8 shows the telescoping canopy rod assembly in a fully collapsed position lying below the upper leg coupler 38 after the canopy 46 has been removed from the wagon. In this case, the canopy rod guide post 42 is pushed downwardly so as to be surrounded by the height adjustment guide 40, and the canopy support rod 44 is pushed downwardly so as to be surrounded by the canopy rod guide post 42. It is to be understood that the positions of the canopy support rod 44 and the canopy rod guide post 42 standing one above the other can be selectively adjusted to vary the height of the canopy above the wagon basket. Each of the canopy support rod 44 and the canopy rod guide post 42 has a plug to prevent their being separated from one another and from the height adjustment guide 40.

As an important feature of this invention, details are now provided to explain the relocation of the wagon frame 3 and the wagon basket 5 carried thereby from a first elevation lying close to the wagon wheels 10 (best shown in FIG. 1) to a second elevation lying higher above the wheels (best shown in FIGS. 2 and 5). It is to be understood that the ability of a user to adjust the elevation of the wagon frame 3 as will now be described is applicable to both folding and non-folding wagons. In this regard, and as was previously described, the relatively narrow height adjustment guides 40 which stand upwardly from the wheel brackets 41 are received within and slidable up and down through the relatively wide height adjustment legs 34 that are connected between lower and upper leg couplers 36 and 38.

Figure 9A:
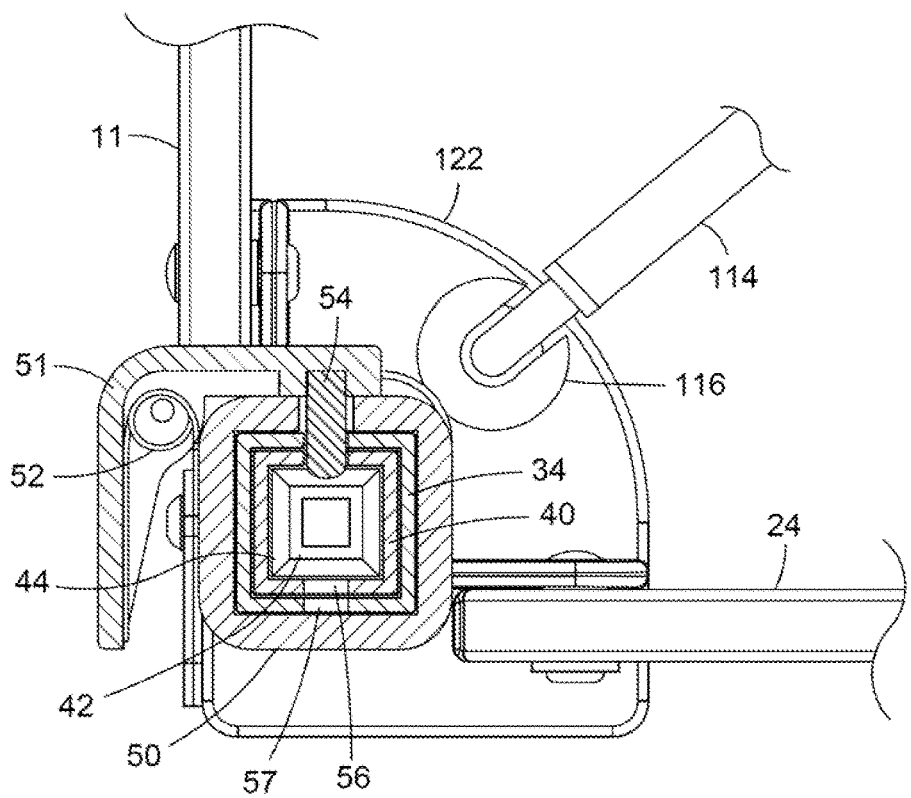
FIG. 9A is a cross-section of the lower leg coupler taken along lines 9A-9A of FIG. 9 with a locking pin of a rotatable locking arm in a locked position relative to the height adjustment leg.
Figure 9B:
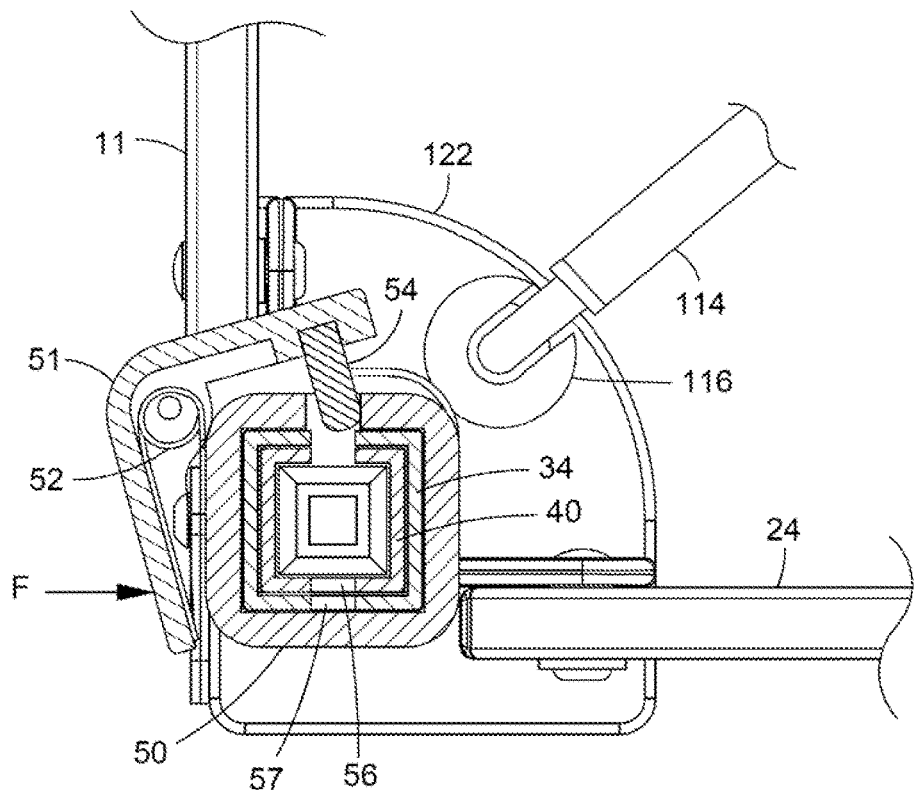
FIG. 9B shows the cross-section of FIG. 9A with the locking pin of the locking arm being rotated to an unlocked position relative to the height adjustment leg.
Figure 13:
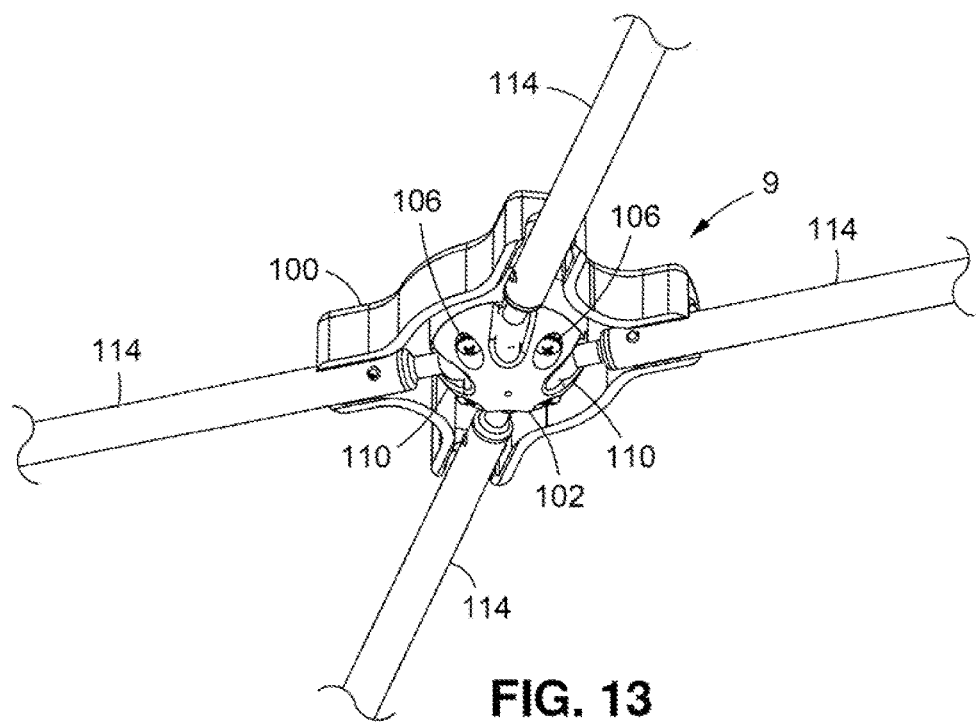
FIG. 13 is a partial bottom perspective view of the collapsible wagon frame support shown in FIG. 10.

Turning in this regard to FIG. 9 of the drawings, one of the lower leg couplers 36 is shown lying in surrounding engagement with the bottom of one of the height adjustment legs 34 that is located at one corner of the rectangular wagon frame 3. The bottom of the lower leg coupler 36 includes a ball receptacle 122 mounted on a ball receptacle base 124 to which a frame reinforcing rod 114 of the soon to be described collapsible wagon frame support 9 of FIGS. 10-14 is detachably connected. The lower leg coupler 36 also includes a collar 50 at the top thereof that surrounds the bottom of the height adjustment leg 34 above the ball receptacle base 124. A locking arm 51 is pivotally coupled to the collar 50 by a pivot pin 53, such that the locking arm is rotatable between locked and unlocked positions in response to a pushing or a pulling force being applied to one end thereof. As is best shown in FIGS. 9A and 9B, a locking pin 54 projects from the opposite end of the locking arm 51 so as to extend inwardly through the collar 50 for receipt by the height adjustment leg 34 surrounded by the collar 50. As is also best shown in FIGS. 9A and 9B, a spring 52 is attached to one side of the collar 50 so as to lie between collar 50 and the locking arm 51.

Figure 1:
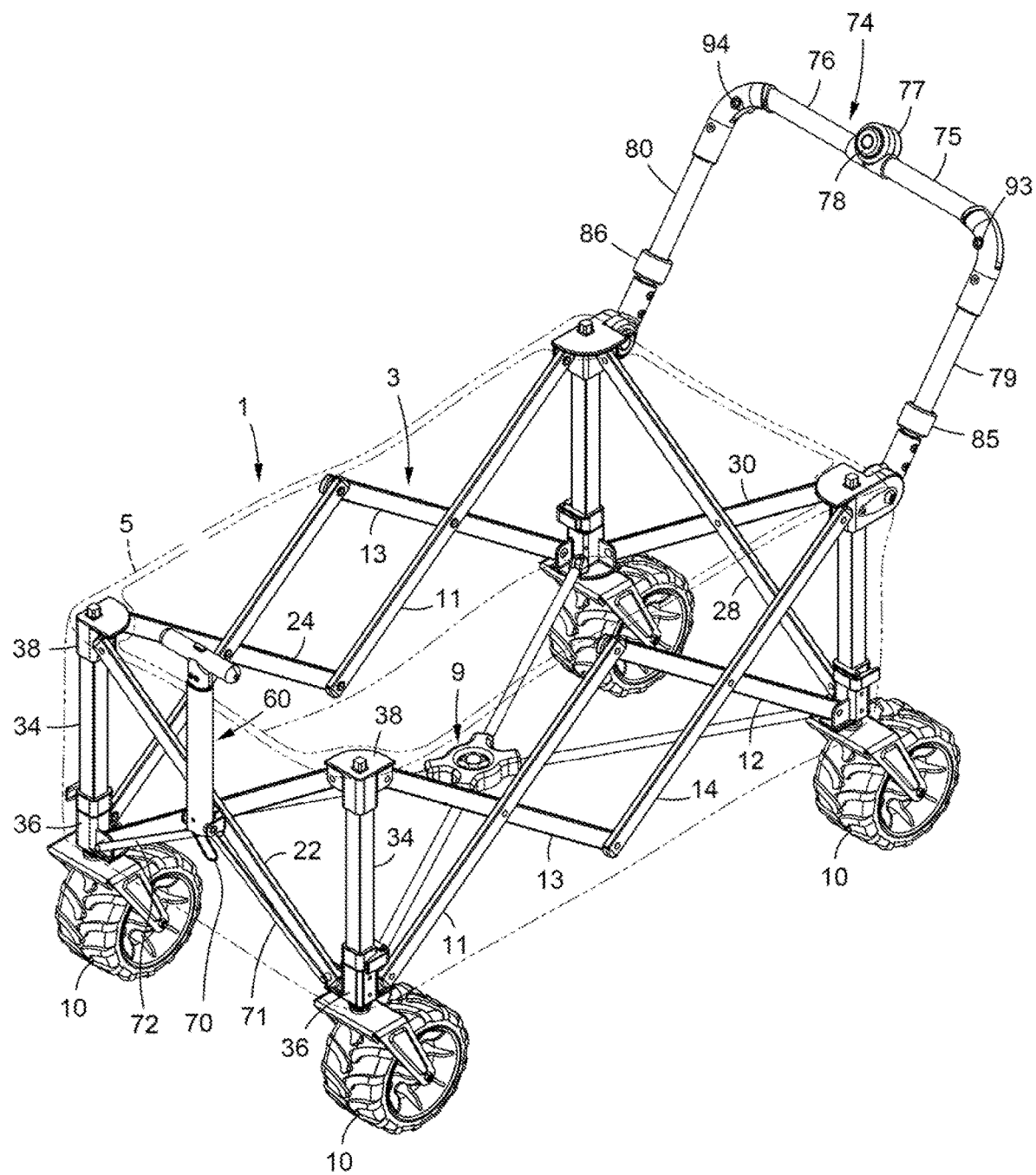
FIG. 1 is a perspective view of a collapsible frame for a folding wagon in an expanded open configuration, wherein the wagon frame is shown having a collapsible frame support detachably connected to the bottom thereof.
Figure 6:
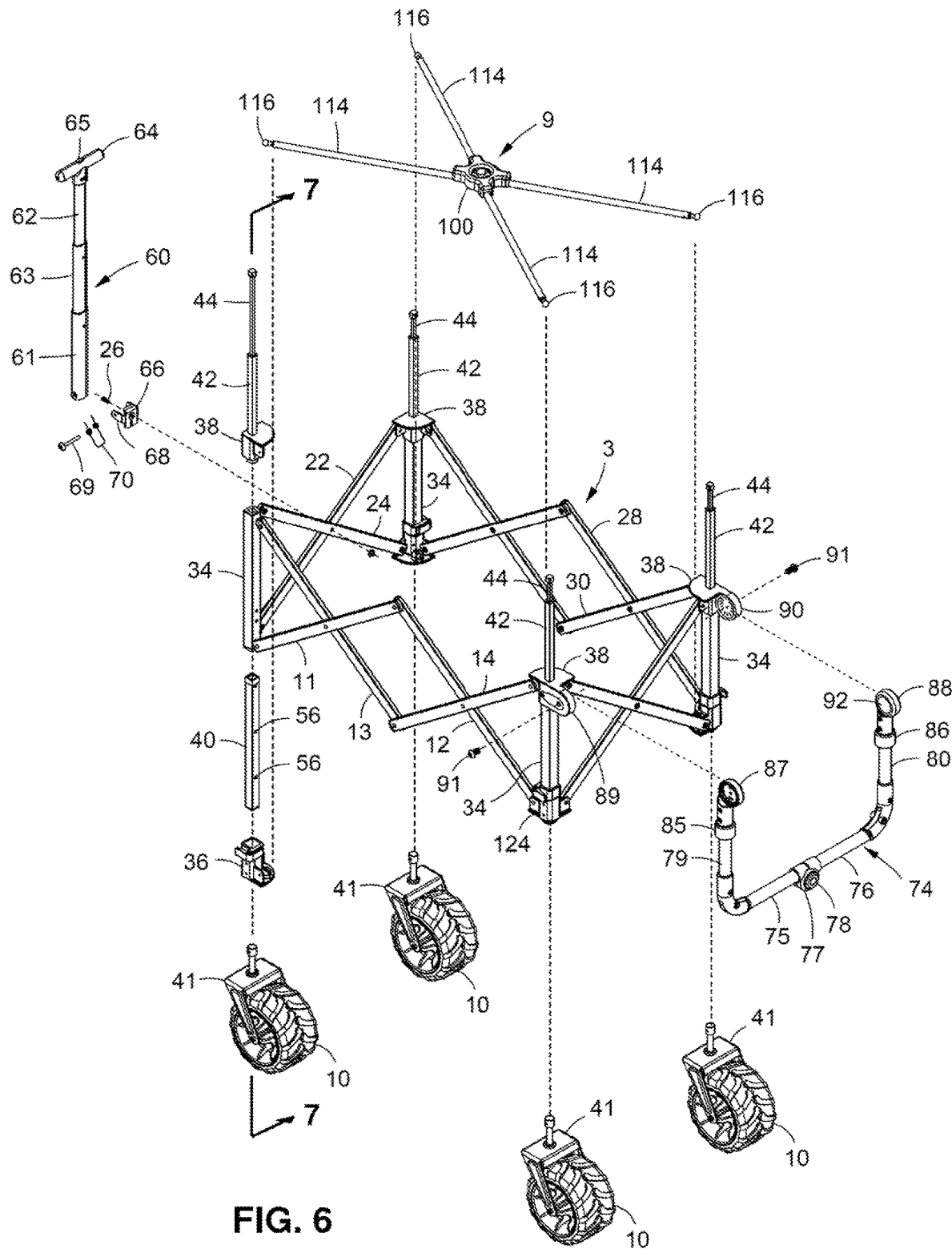
FIG. 6 is an exploded view of the wagon frame shown in FIG. 5.

As is best shown in FIGS. 5 and 6, a series of height fixing holes 56 are formed in the height adjustment guide 40 that is slidable through the height adjustment leg 34. With the locking arm 51 rotated in a first direction around pivot pin 53 to its locked position shown in FIG. 9A, the locking pin 54 that projects from the locking arm 51 is moved through a pin hole 57 that is formed through the height adjustment leg 34 and an axially aligned one of the height fixing holes 56 formed in the height adjustment guide 40. The spring 56 is expanded, and the height adjustment guide 40 is locked in place within the height adjustment leg 34, such that the wagon frame 3 is held at a first elevation above the wheels 10 as shown in FIG. 1.

Figures 7A, 7B:
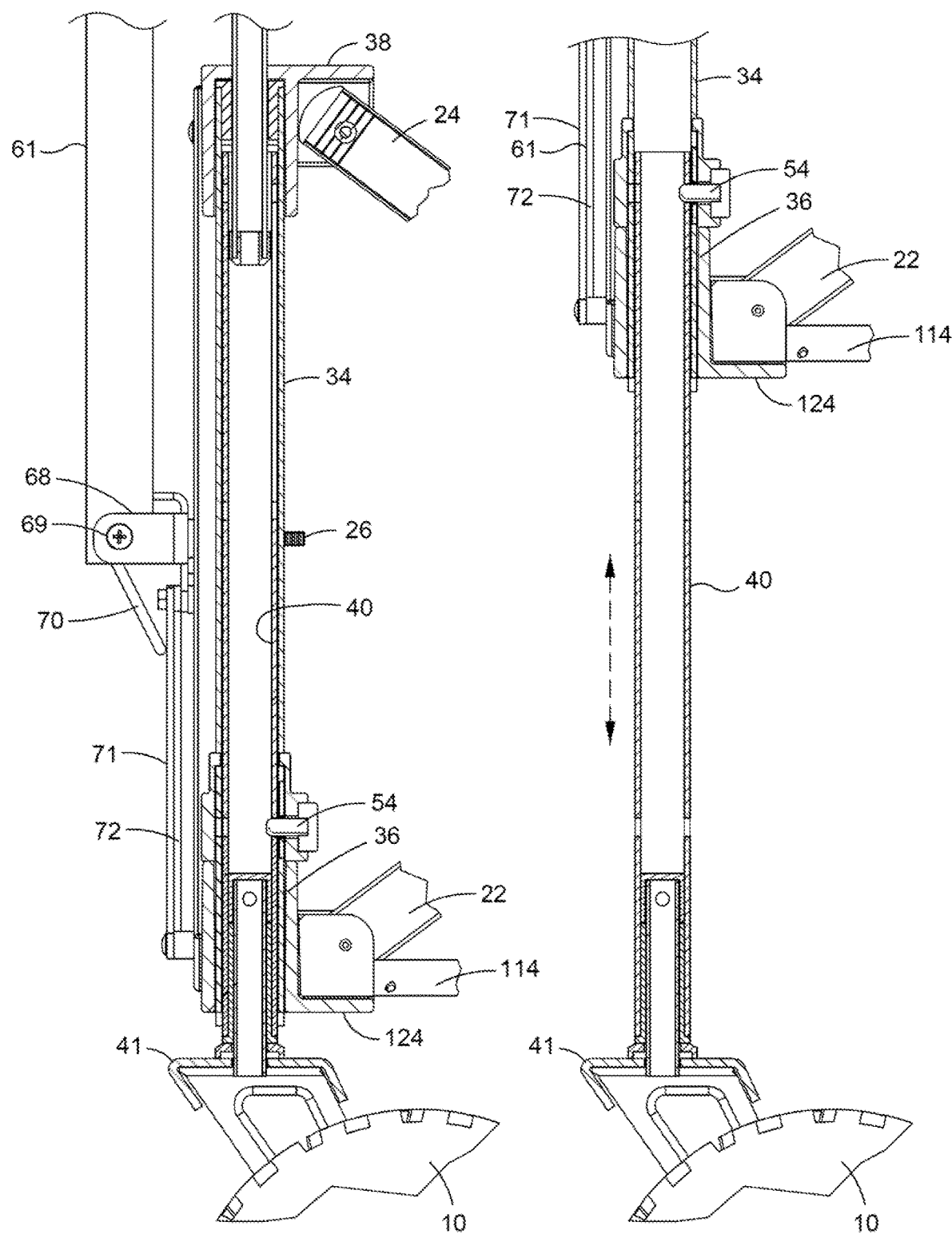
FIG. 7A is an enlarged detail taken from FIG. 7 showing an upstanding narrow height adjustment guide after sliding upwardly through a wide height adjustment leg that is located at one corner of the wagon frame by which the elevation of the wagon frame is adjusted towards the wheels of the wagon.
FIG. 7B shows the upstanding narrow height adjustment guide of FIG. 7A after sliding downwardly through the wide height adjustment leg by which the elevation of the wagon frame is adjusted away from the wheels of the wagon.

Should it be desirable to change the elevation of the wagon frame 3 and the wagon basket 5 carried thereby, a pushing force (designated F in FIG. 9B) is initially applied to the first end of the locking arm 51. The locking arm 51 is caused to rotate in an opposite direction around pivot pin 53 to its unlocked position so that the opposite end of the locking arm from which the locking pin 54 projects moves away from the collar 50. Accordingly, the locking pin 54 is now withdrawn from the axially aligned holes 57 and 56 formed in the height adjustment leg 34 and the height adjustment guide 40 surrounded by the height adjustment leg. At the same time, the spring 56 is compressed. An upward pushing or a downward pulling force applied to one of the wagon wheels 10 after the locking pin 54 has been withdrawn as just described causes the height adjustment guide 40 connected to wheel bracket 41 to correspondingly slide upwardly (best shown in FIG. 7A) or downwardly (best shown in FIG. 7B) through the height adjustment guide 34 within which the guide 40 is received.

The just completed steps are repeated by which to rotate each of the locking arms 51 of the lower leg couplers 36 at each of the other three corners of the rectangular wagon frame 3 to the unlocked position. The remaining height adjustment guides 40 are then pushed upwardly or pulled downwardly through res tire ones of the height adjustment legs 34, whereby to cause a corresponding adjustment in the elevation of the wagon frame 3 towards or away from the wagon wheels 10. Once the position (i.e., elevation) of the wagon frame 3 has been selected and the pushing force F of FIG. 9B is removed from each of the locking arms 51, the springs 52 which have been compressed will automatically expand to cause the locking arms 51 to rotate in the aforementioned first direction around their pivot pins 53, whereby to push the locking pins 54 that project inwardly from respective ones of the locking arms 51 through different ones of the height fixing holes 56 that are formed in the height adjustment guides 40. The height adjustment guides 40 are once again held in place, and the wagon frame 3 will now be locked at its adjusted new elevation with respect to the wheels 10 as shown in FIG. 2.

Referring concurrently to FIGS. 6-8 of the drawings, a telescoping handle 60 is shown pivotally attached to the front of the frame 3 of the folding wagon 1. A pulling force applied to the handle 60 causes the wagon to roll on its wheels 10 from place to place. The telescoping handle 60 includes a lower handle member 61, an upper handle member 62, and an intermediate handle member 63 that is located between the upper and lower handle members 61 and 62.

The lower handle member 61 of the telescoping handle 60 is wider than the intermediate handle member 63 which is wider than the upper handle member 62 so that the handle members can be pushed downwardly and located one within the other when the handle 60 is collapsed (best shown in FIG. 1) or pulled upwardly and outwardly from one another, whereby the handle 60 is axially extended (best shown in FIG. 2).

A grip 64 is connected across the top of the telescoping handle 60 at the upper handle member 62 thereof to which pushing and pulling forces are applied to cause the wagon 1 to roll back and forth. A push-button 65 that is mounted in the grip 64 is depressed to enable the handle to expand from its collapsed configuration of FIG. 1 to its axially extended configuration of FIG. 2. A handle mounting bracket 66 (best shown in FIG. 6) is connected to the front of the wagon 1 by means of the previously referred to pivot coupling (e.g., bolt) 26 that is received through the intersection of the front support arms 22 and 24 of the wagon frame 3. The handle mounting bracket 66 has a pair of handle mounting ears 68 extending forwardly therefrom. With the lower handle member 61 of the telescoping handle 60 located between the pair of handle mounting ears 68 of the handle mounting bracket 66, a handle mounting fastener (e.g., bolt) 69 is pushed laterally through holes formed in the lower handle member 61 and the mounting ears 68, whereby the telescoping handle 60 is pivotally connected to the handle mounting bracket 66 so as to be rotatable through an angle of about 180 degrees relative to the front of the wagon 1. The handle mounting fastener 69 creates an axle around which handle 60 can rotate.

Extending downwardly and outwardly from the bottom of the lower handle member 61 of the telescoping handle 60 is a generally U-shaped handle return 70 having a spring memory. The handle return 70 is preferably a flexible wire that is captured inside the lower handle member 61 by the wire being wrapped around the handle mounting fastener 69 that runs laterally through the lower handle member 61. As is best shown in FIGS. 1 and 2, a pair of upsloping handle reinforcement struts 71 and 72 are connected to the front of the wagon frame 3 ahead of the front support arms 22 and 24. A first of the handle reinforcement struts 71 extends upwardly from one of the lower leg couplers 36 located at one of the front corners of the rectangular wagon frame 3 to the intermediate pivot coupling 26 that runs through the intersection of the front support arms 22 and 24. The second handle reinforcement strut 24 extends upwardly from the other one of the lower leg couplers 36 located at the opposite front corner of the wagon frame 3 to the intermediate pivot coupling 26, such that the upper ends of the handle reinforcement struts 71 and 72 are connected one over the other by coupling 26.

In the event that the telescoping handle 60 is rotated in a first direction 180 degrees downwardly at the front of the wagon frame 3 around the handle mounting fastener (i.e., axle) 69 from its vertically upstanding position shown in FIGS. 6-8, the flexible handle return 70 that depends downwardly from the lower handle member 61 of handle 60 will be correspondingly pushed against the handle reinforcement struts 71 and 72 below the intermediate pivot coupling 26. The handle return 70 will therefore be momentarily bent and stressed. Because of its spring memory, and after the handle 60 has been rotated, the handle return 70 will recover and generate a pushing force by which to automatically cause the handle 60 to rotate in an opposite direction upwardly and return to its initial vertically upstanding position of FIGS. 6-8. By virtue of the foregoing, the telescoping handle 60 will at all times be easily accessible to the user at the front of the wagon 1 without having to bend down to grab the grip 64 and rotate the handle 60 upwardly.

Located at the rear of the wagon frame 3 of the folding wagon 1 opposite the telescoping handle 60 is a rotatable and collapsible handle assembly 74 to which pushing and pulling forces can also be applied to cause the wagon to roll back and forth in the manner of a conventional stroller. Positioned at the top of the handle assembly 74 are a pair of horizontally extending push bars 75 and 76 that are initially held end-to-end and pivotally coupled to one another at first ends thereof by a lock 77 that is operated by a push-button 78. The opposite ends of the horizontally extending push bars 75 and 76 are coupled to respective ones of a pair of cylindrical and upstanding handle length adjusting sleeves 79 and 80 by means of pivots (e.g., bolts) 81 and 82. As is best shown in FIG. 2, the length adjusting sleeves 79 and 80 are sized to surround and slide over and along cylindrical handle supports 83 and 84. Each of the handle length adjusting sleeves 79 and 80 carries a threaded rotatable compression collar 85 and 86 that is loosened or tightened with respect to threads from the handle supports 83 and 84. That is, and as is best shown in FIG. 2, by first loosening and then rotating the compression collars 85 and 86 in a first direction, the handle length adjustment sleeves 79 and 80 are free to be raised or lowered and slide up or down over and along the handle supports 83 and 84 to correspondingly adjust the distance between the push bars 75 and 76 of the handle assembly 74 and the rear of the wagon frame 3. Once the position of the push bars 75 and 76 has been selected to suit the needs of the user, the compression collars 85 and 86 are rotated in an opposite direction to be tightened against the threads of the handle supports 83 and 84 and thereby hold the push bars 75 and 76 in place.

The rotatable and collapsible handle assembly 74 of the folding wagon 1 is shown in FIGS. 1-6 as having a generally U-shaped configuration. The free ends of the U-shaped handle assembly 74 are pivotally connected and rotatable relative to the rear of the wagon frame 3. In particular, and as is best shown in FIG. 6, toothed couplers 87 and 88 located at the free ends of the U-shaped handle assembly 74 are mated to complementary and opposing toothed couplers 89 and 90 that extend rearwardly from each of the upper leg couplers 38 at the tops of respective height adjustment legs 34 located at the rear corners of the rectangular wagon frame 3. Fasteners 91 hold the couplers 87 and 88 against the opposing couplers 89 and 90. Each toothed coupler 87 and 88 has a push-button (only one of which 92 being visible in FIG. 6) to control the rotation of the handle assembly 74 relative to the wagon frame 3. Reference may be made to U.S. Pat. No. 10,562,556 issued Feb. 18, 2020 wherein a pair of push-button operated tooth couplers are shown and described that can be used for the opposing pairs of toothed couplers 87, 89 and 88, 90 referred to above.

When no pushing force is applied to the push-buttons 92 of the toothed couplers 87 and 88, sets of teeth of the couplers 87 and 88 mesh with opposing sets of teeth of the couplers 89 and 90. In this case, the handle assembly 74 is locked in place extending rearwardly and outwardly from the wagon frame 3 at which the axially aligned push bars 75 and 76 are positioned to receive a pushing or a pulling force from the user to cause the wagon to roll from place-to-place. In the case when it is desirable to rotate the handle assembly 74 relative to the wagon frame 3, such as when the folding wagon will be folded to its compact collapsed configuration (as shown in FIGS. 15-18), the user applies pushing forces to the push-buttons 92 of the toothed couplers 87 and 88.

The simultaneous depression of the push-buttons 92 causes the sets of teeth of the couplers 87 and 88 to be disengaged from the sets of teeth of the opposing couplers 89 and 90. The rotatable and collapsible handle assembly 74 is now free to rotate downwardly from its initial rearwardly extending position to a vertical position lying alongside the rear of the wagon frame 3 at which time the pushing forces being applied to the push-buttons 92 are terminated and the handle assembly 74 is once again locked in place.

Figure 1A:
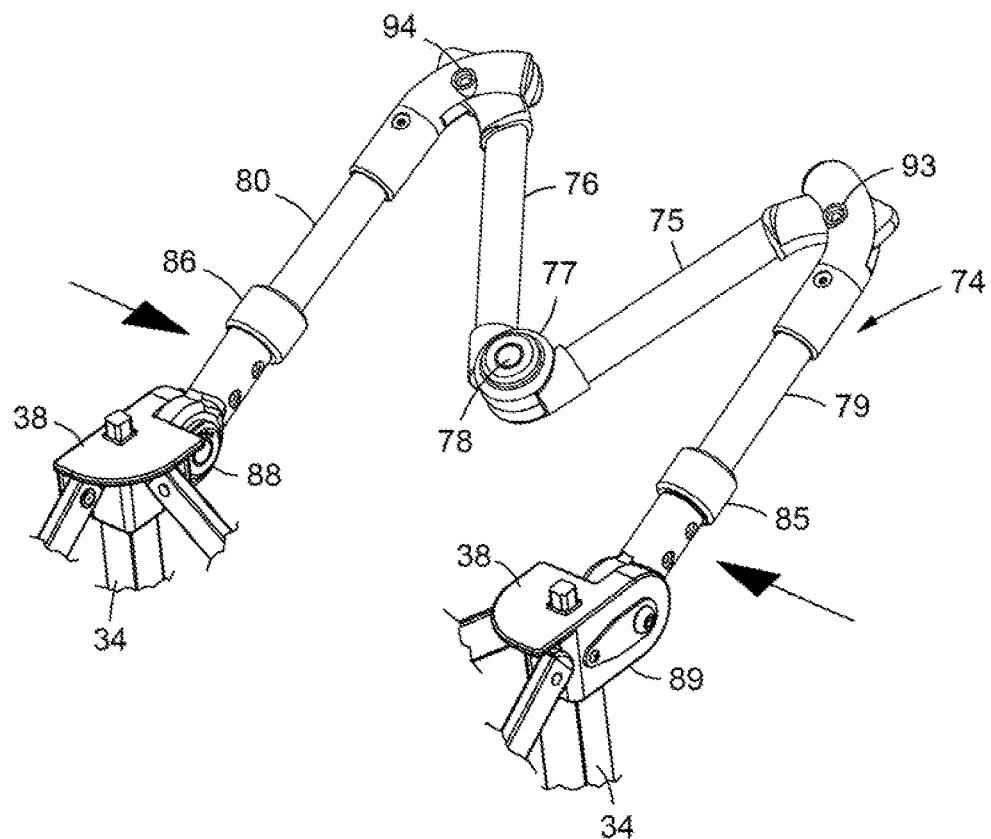
FIGS. 1A and 1B show a collapsible handle connected to the rear of the wagon frame and being collapsed inwardly upon itself when the wagon of FIG. 1 is being folded to a compact collapsed configuration.
Figure 1B:
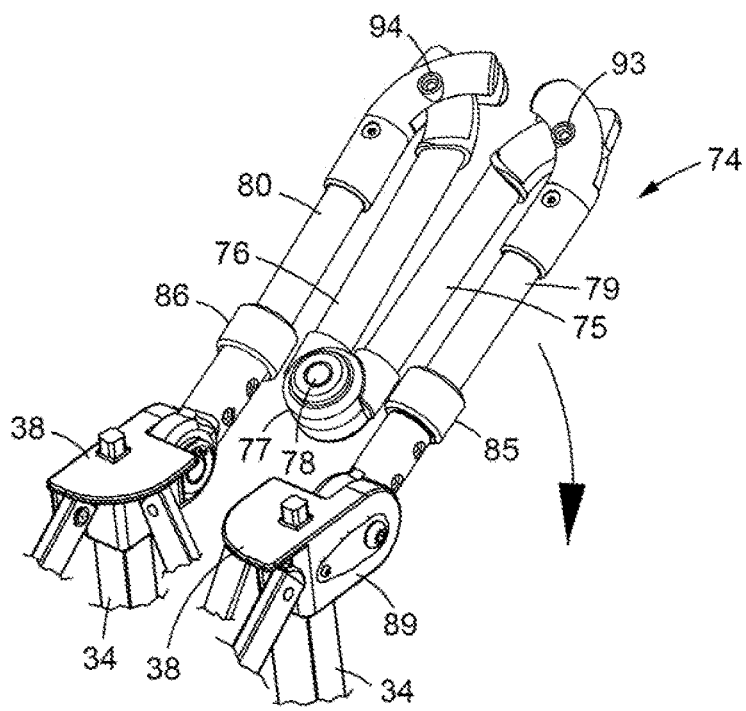

To enhance the ability of the folding wagon 1 to be folded to its compact collapsed configuration of FIGS. 15-18, the horizontally extending and end-to-end aligned push bars 75 and 76 at the top of the rotatable and collapsible handle assembly 74 can be rotated towards the rear of the wagon frame 3 so that the handle assembly 74 is collapsed inwardly upon itself. To accomplish the foregoing, the push-button 78 of the lock 77 is depressed. The lock 77 has a first toothed coupler (similar to that designated 87 in FIG. 6) that is connected over and against a complementary second toothed coupler (similar to that designated 89 in FIG. 6). That is to say, the toothed couplers of the lock 77 have sets of teeth that lie above the other. Prior to a pushing force being applied to the push-button 78, the opposing sets of teeth of the first and second couplers of lock 77 mesh with one another and the push bars 75 and 76 are locked in end-to-end axial alignment as shown in FIG. 1. When the push-button 78 of the lock 77 is depressed, the opposing sets of teeth of the first and second couplers of the lock 77 are disengaged from and rotatable relative to one another. Accordingly, the horizontally extending push bars 75 and 76 are now unlocked from their initial end-to-end axial alignment shown in FIG. 1 so as to be free to rotate at the first ends thereof at the lock 77 and at the opposite ends thereof at the pivots 93 and 94 with respect to the upstanding handle length adjustment sleeves 79 and 80, whereby to assume a generally V-shape as shown in FIGS. 1A and 1B.

Details of the collapsible wagon frame support 9 that is detachably connected to the bottom of the frame 3 of the folding wagon 1 and above which the wagon basket 5 is held are described while referring to FIGS. 10-14 of the drawings. The structure and operation of the wagon frame support 9 by which to enable the wagon 1 to collapse inwardly upon itself when the wagon is folded into its compact collapsed configuration are similar to the structure and operation of the wagon frame support that is shown and described in the earlier mentioned patent application Ser. No. 15/590,942 which has already been incorporated herein by reference. Therefore, only a brief description of the wagon frame support 9 will be provided.

The collapsible wagon frame support 9 of the folding wagon 1 includes an upper ball socket cover 100. A lower hub 102 is connected to the upper ball socket cover 100 by means of fasteners (e.g., screws) 106 that are received through respective holes 108 formed in the lower hub 102 (best shown in FIGS. 11 and 12). The lower hub 102 has a set of pockets 110 that are configured to receive therewithin respective balls 112 from a corresponding set of frame reinforcing rods 114 that lie at the bottom of the wagon 1 below the basket 3. Each of the frame reinforcing rods 114 carries a ball 112 and 116 at each of the opposite ends thereof.

Figure 14:
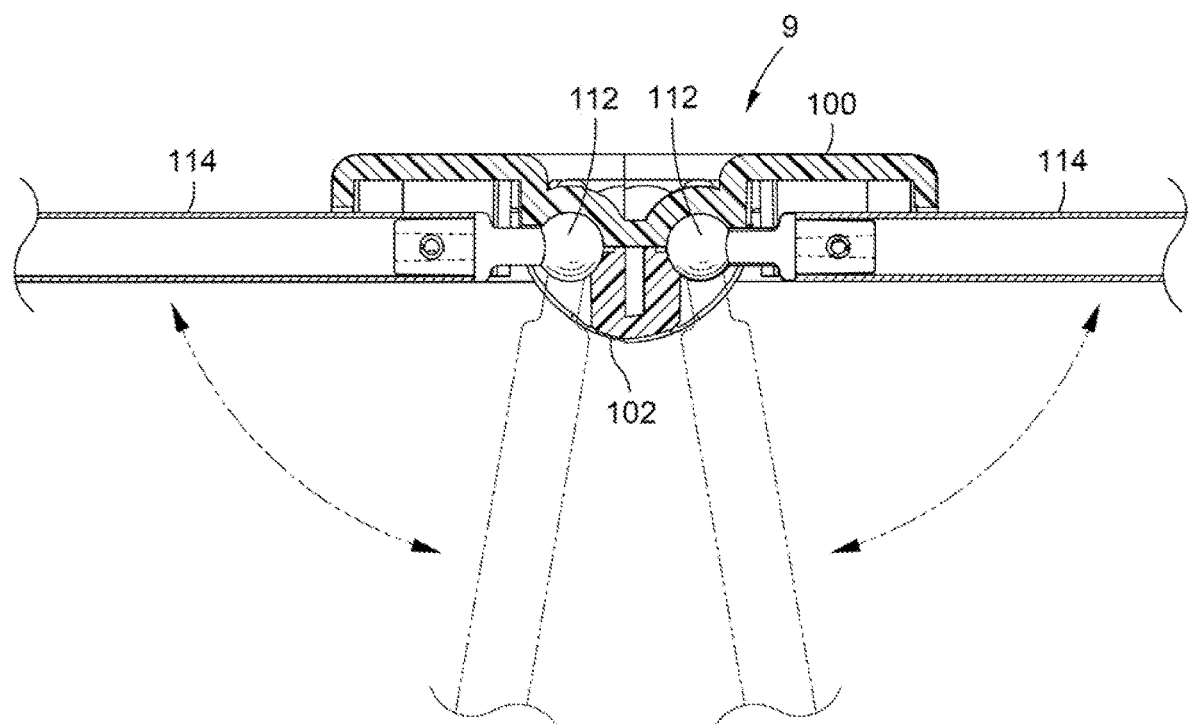
FIG. 14 is a cross-section of the collapsible wagon frame support taken along lines 14-14 of FIG. 10.
Figure 15:
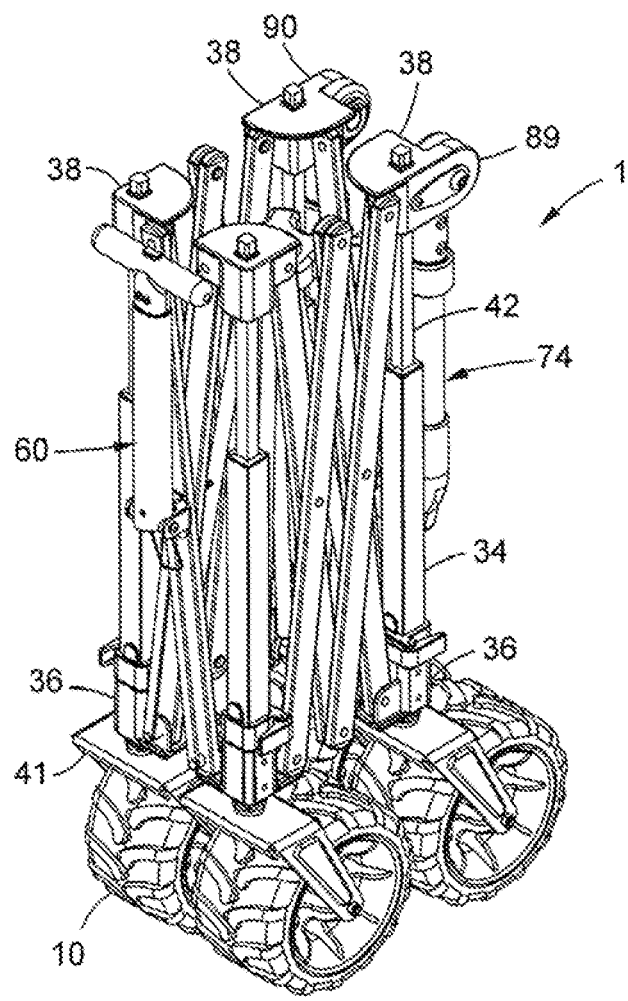
FIGS. 15-18 show each of the wagon frame and the wagon frame support after being collapsed alongside one another when the folding wagon has been folded to a compact collapsed configuration.
Figure 16:
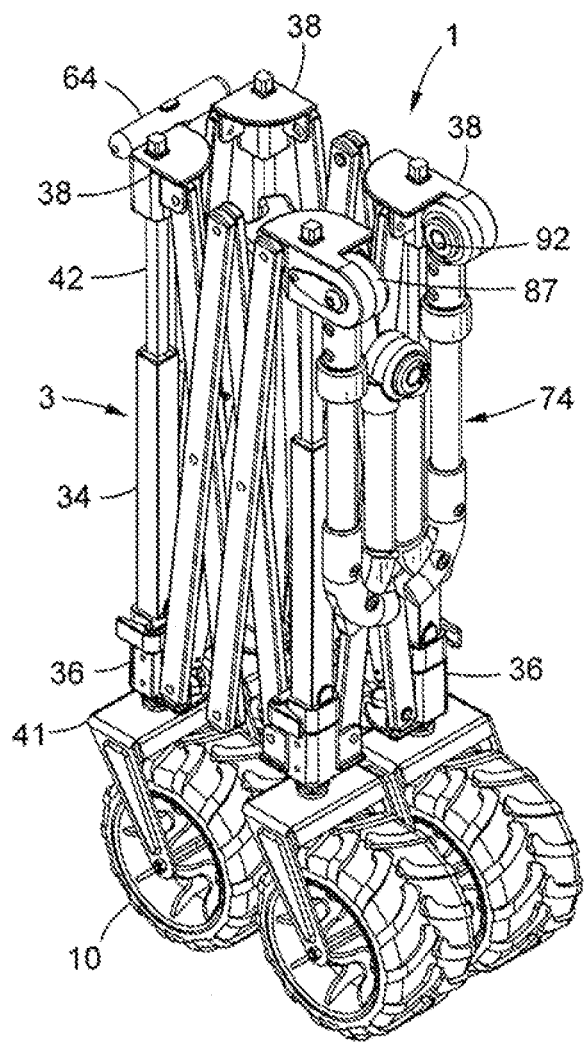
Figure 17:
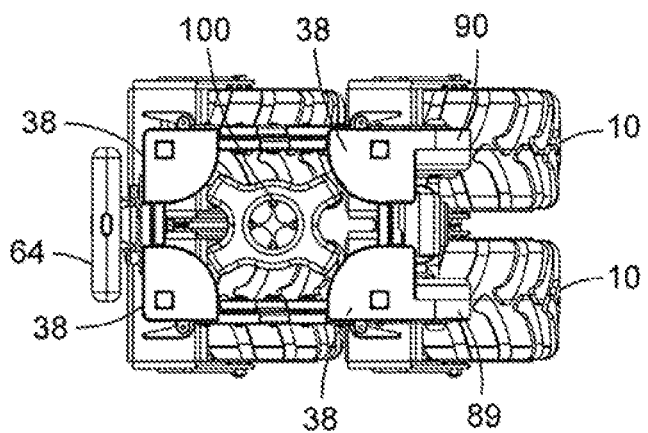
Figure 18:
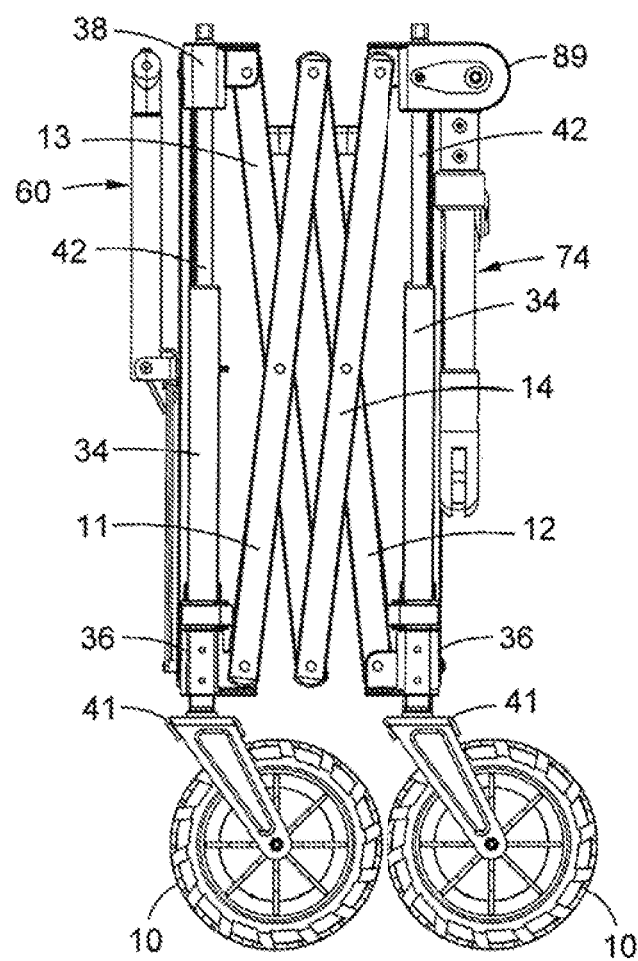

The upper ball socket cover 100 of the wagon frame support 9 has a set of recesses 120 formed therein (best shown in FIG. 12) that are also configured to receive respective ones of the balls 112 that are carried at the first end of each of the frame reinforcing rods 114. When the upper ball socket cover 100 and the lower hub 102 are connected together to lie at the center of the wagon frame support 9, the recesses 120 of the upper cover 100 and the pockets 110 of the lower hub 102 lie one above the other to establish sockets within which to capture respective ones of the balls 110 of the frame reinforcing rods 114. In this case, ball and socket couplings are created that permit the balls 110 to swivel and the frame reinforcing rods 114 to rotate upwardly as is best shown in FIG. 14 from a substantially horizontal position when the wagon is in use in its expanded open configuration to a substantially vertical position when the wagon is folded to its collapsed configuration of FIGS. 15-18 for transport and storage.

Referring briefly once again to FIG. 9 of the drawings, each ball 116 that is carried at the opposite end of a frame reinforcing rod 114 is received within and captured by a respective ball receptacle 122 that is mounted on a ball receptacle base 124 of a lower leg coupler 36 that surrounds the bottom of a height adjustment leg 34 located at one of the corners of the rectangular wagon frame 3. The receipt of the ball 116 by the ball receptacle 122 creates another ball and socket coupling that permits the ball 116 to swivel and the frame reinforcing rod 114 to rotate upwardly from its substantially horizontal position to its substantially vertical position as shown in FIG. 14 when the wagon 1 is folded to its collapsed configuration. In this same regard, the balls 16 can be pulled outwardly from respective ones of the ball receptacles 122 so that the wagon frame support 9 is detached from the bottom of the wagon frame 3 and separated from the wagon 1. In this case, the wagon frame 3 can be used as a portable enclosure for children or animals.

When the folding wagon 1 is folded from its expanded open configuration to its compact collapsed configuration and the frame supporting rods 114 rotate upwardly from their substantially horizontal position at the bottom of the wagon frame 3 to their substantially vertical position, the combination upper ball socket cover 100 and the lower hub 102 of the collapsible wagon frame support 9 are pushed upwardly by the rods 114 towards the top of the wagon. Referring concurrently in this regard to FIGS. 15-18 of the drawings, the wagon 1 is shown after being folded to its compact collapsed configuration.

Prior to folding the wagon 1, the members 61, 62 and 63 of the telescoping handle 60 shown in FIGS. 7 and 8 of the front of the wagon frame 3 are pushed downwardly and one within the other. The overhead canopy 46 shown in FIG. 2 is removed from the wagon, and each of the canopy support rods 44 and the canopy guide posts 42 shown in FIG. 5 are pushed downwardly into respective upstanding height adjustment guides 40 that are surrounded by height adjustment legs 34 at the corners of the rectangular wagon frame 3. The push-button 78 of the handle lock 77 shown in FIG. 6 is depressed, and the end-to-end aligned push bars 75 and 76 at the top of the handle assembly 74 are rotated inwardly to assume their generally V-shape as shown in FIGS. 1A and 1B. The push-buttons 92 at the couplers 87 and 88 of the handle assembly 74 are simultaneously depressed, and the handle assembly 74 is then rotated downwardly from its rearwardly extending stroller position shown in FIG. 1 to its vertical position lying alongside the rear of the wagon frame 3 shown in FIG. 18.

A lifting force is then applied in the direction of the arrow 126 shown in FIG. 5 to the combination upper ball socket cover 100 and lower hub 102 at the center of the collapsible wagon frame support 9 that is connected by way of the frame reinforcing rods 114 to the ball receptacles 122 (of FIG. 9) of the lower leg couplers 36 located at the corners of the wagon frame 3. As earlier described, first ball and socket couplings are established between the balls 112 at the first ends of the frame reinforcing rods 114 of the wagon frame support 9 and the combination upper ball socket cover 100 and the lower hub 102. Second ball couplings are established between the balls 116 at the opposite ends of the frame reinforcing rods 114 and the ball receptacles 122 mounted on the ball receptacle bases 124.

By virtue of the foregoing, the frame reinforcing rods 114 which radiate outwardly from the combination upper ball socket cover 100 and lower hub 102 at the center of the wagon frame support 9 will rotate upwardly in response to the lifting force 126 applied to frame support 9. The upward rotation of the frame reinforcing rods 114 connected to the bottom of the wagon frame 3 correspondingly pulls the front and rear ends of the wagon frame towards one another, whereby the wagon frame will collapse inwardly upon itself as shown in FIGS. 15-18. Accordingly, the folding wagon 1 is now advantageously reduced in size so as to be ideal for storage and/or transport.

The invention claimed is:

1. A wagon comprising:
  a wagon frame having a front, a rear, a top, a bottom and a plurality of corners;
  a wagon basket carried by said wagon frame;
  a set of wheels lying below said wagon basket and coupled to said wagon frame on which the wagon rolls from place-to-place;
  a plurality of height adjustment guides coupled to respective ones of said set of wheels so as to stand upwardly therefrom; and
  a plurality of height adjustment legs located at respective ones of the plurality of corners of said wagon frame, each of said plurality of height adjustment legs being sized to surround and receive a respective one of said plurality of height adjustment guides therewithin, such that said plurality of height adjustment guides are slidable upwardly and downwardly through said plurality of height adjustment legs so as to move towards and away from said wagon basket, whereby the position of said wagon frame and the wagon basket carried thereby is adjusted between first and second elevations with respect to said set of wheels,
  wherein each one of said set of wheels is coupled to one of said plurality of corners of said wagon frame by a wheel bracket, and wherein each of said height adjustment guides is connected to and stands vertically upward from a respective wheel bracket, such that an upward pushing or a downward pulling force applied to one of the set of wheels causes the height adjustment guide connected to the respective wheel bracket of said one wheel to correspondingly slide upwardly or downwardly through the height adjustment leg within which said height adjustment guide is received, said height adjustment guides sliding upwardly and downwardly through said height adjustment legs one at a time and independently of one another.

2. The wagon recited in claim 1, further comprising a lock carried by at least one of said plurality of height adjustment legs and communicating with said vertically upstanding height adjustment guide surrounded by the at least one of said plurality of height adjustment legs to lock said vertically upstanding height adjustment guide in place within the at least one of said plurality of height adjustment legs.

3. The wagon recited in claim 2, wherein said lock includes a locking pin that extends from the at least one of said plurality of height adjustment legs for removable receipt by the vertically upstanding height adjustment guide surrounded by said at least one height adjustment leg by which to lock said vertically upstanding height adjustment guide in place within said height adjustment leg.

4. The wagon recited in claim 3, wherein said lock also includes a collar surrounding the at least one of said plurality of height adjustment legs, said locking pin extending from said collar for said removable receipt by the vertically upstanding height adjustment guide surrounded by said at least one height adjustment leg by which to lock said vertically upstanding height adjustment guide in place within said height adjustment leg.

5. The wagon recited in claim 4, wherein said lock also includes a rotatable locking arm pivotally coupled to said collar, said locking pin being carried by said rotatable locking arm, and said locking arm rotating in a first direction relative to said collar by which to move said locking pin into said removable receipt by the vertically upstanding height adjustment guide surrounded by said at least one height adjustment leg.

6. The wagon recited in claim 5, wherein the vertically upstanding height adjustment guide surrounded by said at least one height adjustment leg has at least first and second height fixing holes located one above the other, said locking pin being moved by said rotatable locking arm into removable receipt by a first of said height fixing holes when said wagon frame and the basket carried thereby are positioned at said first elevation, and said locking pin being moved by said rotatable locking arm into removable receipt by the second of said height fixing holes when said wagon frame and the basket carried thereby are positioned at said second elevation.

7. The wagon recited in claim 5, wherein said lock also includes a spring lying between the rotatable locking arm of said lock and the collar of said lock to which said locking arm is pivotally coupled, said spring urging said rotatable locking arm to rotate in an opposite direction relative to said collar, whereby to cause the locking pin carried by said locking arm to be removed from the vertically upstanding height adjustment guide surrounded by said at least one height adjustment leg.

8. The wagon recited in claim 1, further comprising a removable canopy and a plurality of telescoping canopy support rods being movable downwardly and inwardly of and slidable upwardly and outwardly from respective ones of said plurality of height adjustment guides by which to engage and hold said removable canopy above said wagon basket.

9. The wagon recited in claim 8, further comprising a plurality of telescoping canopy rod guide posts being sized to surround respective ones of said plurality of telescoping canopy support rods, said plurality of telescoping canopy rod guide posts being movable downwardly and inwardly of and slidable upwardly and outwardly from said plurality of height adjustment guides along with said plurality of telescoping canopy support rods.

10. The wagon recited in claim 1, further comprising a rotatable handle being pivotally coupled to and rotatable in a first direction downwardly relative to the front of said wagon frame from a vertically upstanding position through an angle of 180 degrees.

11. The wagon recited in claim 10, wherein said rotatable handle has a flexible handle return depending therefrom, said flexible handle return rotating in said first direction with said handle so as to move into contact with and flex against the front of said wagon frame, whereby to cause said handle to rotate upwardly and in an opposite direction towards said vertically upstanding position.

12. The wagon recited in claim 1, further comprising a handle pivotally coupled to said wagon frame at the rear thereof, said handle being rotatable downwardly from a first position extending outwardly from the rear of said wagon frame to a second position lying alongside the rear of said wagon frame.

13. The wagon recited in claim 12, wherein said handle includes a pair of push bars to which a pushing force is applied to cause said wagon to roll on said set of wheels, first ends of said pair of push bars being pivotally connected to one another at a lock having a push-button, and opposite ends of said pair of push bars being pivotally connected to respective ones of a pair of handle sleeves that lie between the opposite ends of said pair of push bars and the rear of said wagon frame, the push-button of said lock being depressed to enable said pair of push bars to rotate at said lock relative to said pair of handle sleeves between a first position wherein said pair of push bars are axially aligned end-to-end with one another and a second position wherein said pair of push bars have a V-shaped alignment with one another.

14. The wagon recited in claim 13, wherein said handle also includes a pair of handle supports pivotally connected to the rear of said wagon frame by which said handle is rotatable downwardly from said first position to said second position, said pair of handle sleeves being sized to slide over and along respective ones of said pair of handle supports by which to correspondingly change the distance between said pair of push bars and the rear of the wagon frame.

15. The wagon recited in claim 1, wherein said wagon frame has a plurality of corners and a ball receptacle located at each of said plurality of corners, said wagon frame also having a wagon frame support located below said wagon basket, said wagon frame support having a central hub and a corresponding plurality of frame reinforcing rods pivotally connected at first ends thereof to said central hub and pivotally connected at opposite ends thereof to respective ball receptacles located at the plurality of corners of said wagon frame, such that said wagon frame support is rotatable relative to said wagon frame at said central hub and at said ball receptacles.

16. The wagon recited in claim 15, wherein each of the plurality of frame reinforcing rods of said wagon frame support has a ball located at each of the first and the opposite ends thereof such that the balls located at the first ends of said plurality of frame reinforcing rods are pivotally coupled to said central hub by means of first ball and socket couplings therebetween, and the balls located at the opposite ends of said plurality of frame reinforcing rods are pivotally coupled to respective ones of said ball receptacles by means of second ball and socket couplings therebetween.

17. The wagon recited in claim 16, wherein the balls located at the opposite ends of said plurality of frame reinforcing rods are removable from said ball receptacles such that said wagon frame support is detachable from said wagon frame.

18. A wagon comprising:
  a wagon frame having a front, a rear, a top, a bottom and a plurality of corners;
  a wagon basket carried by said wagon frame;
  a set of wheels lying below said wagon basket and coupled to said wagon frame on which the wagon rolls from place-to-place;
  a plurality of height adjustment guides coupled to respective ones of said set of wheels so as to stand upwardly therefrom;

a plurality of height adjustment legs located at respective ones of the plurality of corners of said wagon frame, each of said plurality of height adjustment legs being sized to surround and receive a respective one of said plurality of height adjustment guides therewithin, such that said plurality of height adjustment guides are slidable upwardly and downwardly through said plurality of height adjustment legs so as to move towards and away from said wagon basket, whereby the position of said wagon frame and the wagon basket carried thereby is adjusted between first and second elevations with respect to said set of wheels;

a removable canopy; and a plurality of canopy support rods being slidable downwardly and inwardly of and slidable upwardly and outwardly from respective ones of said plurality of height adjustment guides of which to attach said removable canopy to said wagon frame above said wagon basket, such that each of said plurality of downwardly sliding canopy support rods is telescopically received within and surrounded by a respective one of said plurality of height adjustment guides and a respective one of said plurality of height adjustment legs within which the one of said one height adjustment guides is slidably received when said removable canopy is detached from said wagon frame and said plurality of height adjustment guides slide upwardly through said plurality of height adjustment legs towards said wagon basket.

\* \* \* \* \*